United States Patent [19]

Abe et al.

[11] Patent Number: 4,852,183
[45] Date of Patent: Jul. 25, 1989

[54] PATTERN RECOGNITION SYSTEM

[75] Inventors: Shigeru Abe; Yasuaki Nakamura; Katsuyuki Kamei, all of Hyogo, Japan

[73] Assignee: Mitsubishi Denki Kabushiki Kaisha, Tokyo, Japan

[21] Appl. No.: 52,851

[22] Filed: May 20, 1987

[30] Foreign Application Priority Data

| May 23, 1986 | [JP] | Japan | 61-119638 |
| May 23, 1986 | [JP] | Japan | 61-119639 |
| Aug. 11, 1986 | [JP] | Japan | 61-188109 |
| Sep. 5, 1986 | [JP] | Japan | 61-208076 |
| Jan. 28, 1987 | [JP] | Japan | 62-19022 |

[51] Int. Cl.$^4$ ............................................. G06K 9/62
[52] U.S. Cl. ........................................ 382/34; 382/61
[58] Field of Search ............... 382/42, 48, 45, 8, 34, 382/23, 61

[56] References Cited

U.S. PATENT DOCUMENTS

| 3,384,875 | 5/1968 | Bene et al. | 382/30 |
| 3,898,617 | 8/1975 | Kashioka | 382/8 |
| 3,967,053 | 6/1976 | Grosskopf | 382/48 |
| 4,136,332 | 1/1979 | Kadota | 382/34 |
| 4,138,662 | 2/1979 | Shimoyama | 382/61 |
| 4,244,029 | 1/1981 | Hogan | 382/34 |
| 4,319,221 | 3/1982 | Sakoe | 382/34 |
| 4,479,236 | 10/1984 | Sakoe | 382/34 |
| 4,558,462 | 12/1985 | Horiba | 382/42 |

OTHER PUBLICATIONS

Gordon J. Vanderbrug et al., "Two-Stage Template Matching", IEEE Transactions on Computers, vol. C-26, No. 4, pp. 384-393, Apr. 1977.
Philip M. Merlin et al., "A Parallel Mechanism for Detecting Curves in Pictures", IEEE Transactions on Computers, vol. C-24, pp. 96-98, Jan. 1975.
A. Rosenfeld et al., "Digital Picture Processing", Sec. Edition, Academic Press, (1982), vol. 2, pp. 36-49 and 113-121.
E. L. Hall, "Computer Image Processing and Recognition", Academic Press, (1979), pp. 480-487.
Yoshikazu Dezuka et al., "Digital Image Process Engineering", Jun. 15, 1985, pp. 72-79 and 106-111.
Takashi Matsuyama, "Introduction to Computer Image Processing", Mar. 10, 1985, pp. 148-153.

Primary Examiner—Leo H. Boudreau
Attorney, Agent, or Firm—Bernard, Rothwell & Brown

[57] ABSTRACT

Disclosed is a pattern recognition system in which a memory stores four kinds of data including initial binary image data from which a specific pattern as an object of identification is extracted, logical operation designation data, e.g., shift vector data, for prescribing the operational sequence and type of logical operation for the recognition of the initial binary image data, partial pattern location binary image data indicative of the existing positions, in the initial binary image data, of partial patterns divided from the specific pattern, and pattern location binary image data indicative of the position of the specific pattern existing in the initial binary image data, a raster arithmetic operation unit implements a raster operation between two binary image data by taking out corresponding bit regions from the data in accordance with the logical operation designation data and stores the logical operation result of each bit region in the memory, and a transforming or processing unit controls the raster operation unit in carrying out the raster operation based on the partial pattern location binary image data in accordance with the operational sequence and type of logical operation prescribed by the logical operation designation data; thereby accomplishing a fast transformation process for the initial binary image data to the pattern location binary image data.

11 Claims, 21 Drawing Sheets

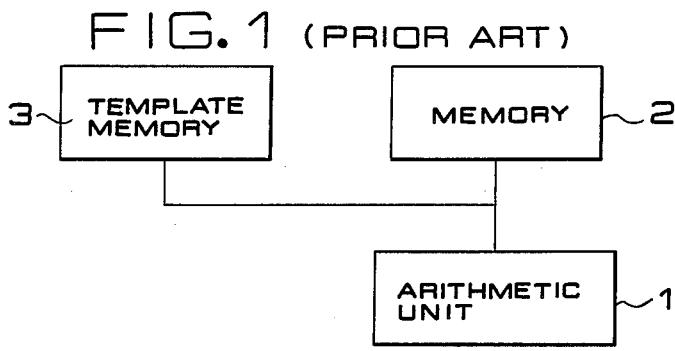
FIG. 1 (PRIOR ART)
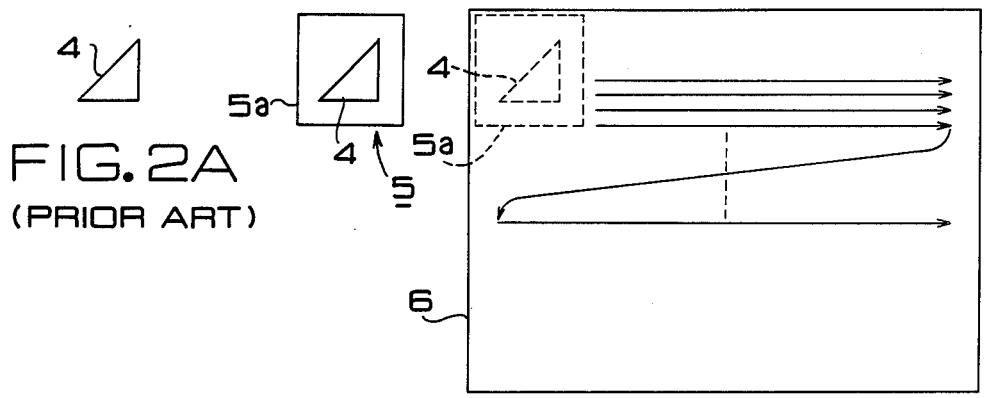
FIG. 2A (PRIOR ART)
FIG. 2B (PRIOR ART)
FIG. 2C (PRIOR ART)
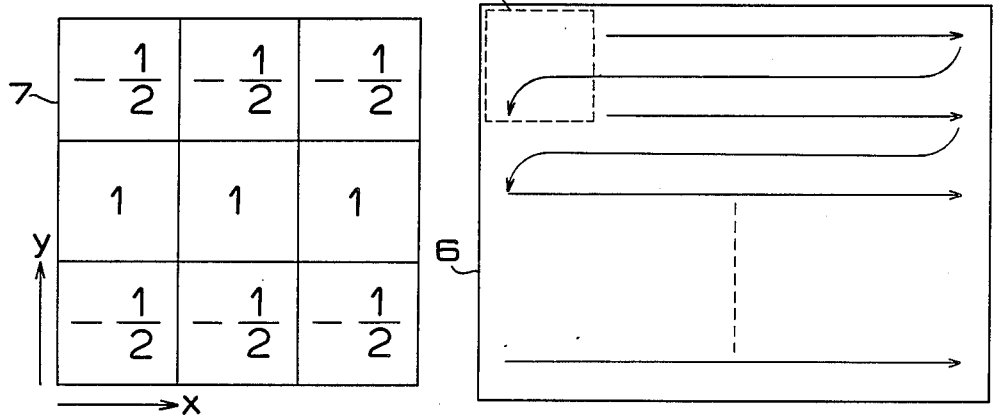
FIG. 3A (PRIOR ART)
FIG. 3B (PRIOR ART)

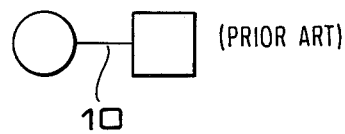
FIG. 4A (PRIOR ART)
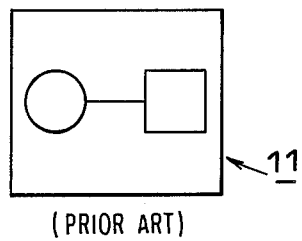
FIG. 4B (PRIOR ART)
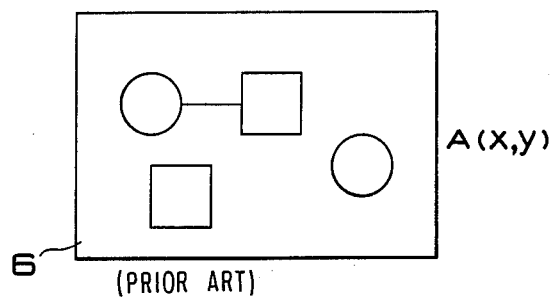
FIG. 5A (PRIOR ART)
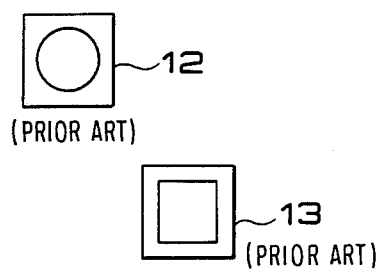
FIG. 4C (PRIOR ART)
FIG. 4D
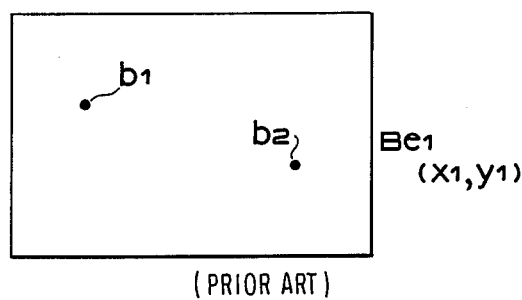
FIG. 5B (PRIOR ART)
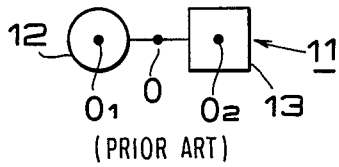
FIG. 4E (PRIOR ART)
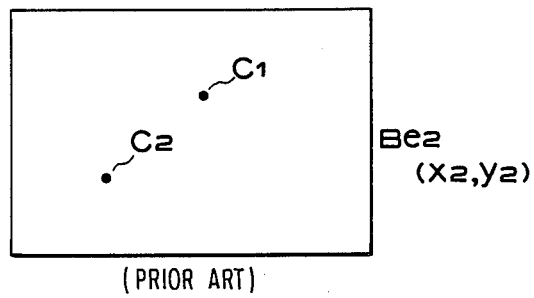
FIG. 5C (PRIOR ART)

50

51

52

53

54

55

56

57

58

PATTERN RECOGNITION SYSTEM

BACKGROUND OF THE INVENTION

1. Field of the Invention

The present invention relates to a pattern recognition system which recognizes input data of characters, images, waveforms and the like, and particularly identifies image data to be any one of inferred patterns.

2. Description of the Prior Art

With a recent drastic progress in the computer application technology, various beneficial technical innovation are under way in the field of image processing techniques dealing with characters, figures, photographs, and the like. One of the fundamentals is the improved pattern recognition technique. The computerized pattern recognition technique is applied to the extensive technical fields including character recognition and process, geometric figure recognition and process, voice recognition and process, industrial robot sight function, bionics, and the like.

The most primitive method of pattern recognition is "pattern matching" in which two patterns are aligned and the degree of their matching is measured in terms of a correlation function or the like. The pattern alignment is based on a template which is a pattern representing a class or category. Accordingly, this pattern matching method is to measure the degree of matching between an unknown pattern and the template of each class; therefore it is also called "template matching".

A conventional pattern recognition system uses the above-mentioned template matching method, and this method is described in detail in publication "Digital Image Process Engineering" by Yoshikazu Dezuka, Tadahiro Kitahashi and Hideo Ogawa, pp. 107-111, published on June 15, 1985 by Nikkan Kogyo Shinbun. The pattern recognition system using this method consists of an arithmetic unit 1, a memory 2 and a template memory 3 as shown in the block diagram of FIG. 1. The arithmetic unit 1 measures the degree of matching between the data stored in the memory 2 and the data stored in the template memory 3. The memory 2 stores an initial binary image data of a drawing on which a specific pattern is identified. The template memory 3 stores the above-mentioned template data.

Next, the operation of the above-mentioned pattern recognition system will be described with reference to FIGS. 2A, 2B and 2C. In the case of identifying a pattern 4 shown in FIG. 2A, a template data 5 shown in FIG. 2B is set in the template memory 3, and the template data 5 is collated by the arithmetic unit 1 with binary image data (will be termed "image data" hereinafter) of the drawing stored in the memory 2. The arithmetic unit 1 identifies a pattern on the drawing by examining the degree of matching between values of pixels of the template data 5 and values of pixels in a region 5a of the template data 5 (shown by the dashed block in FIG. 2C) in the image data 6. This operation is implemented for the entirety of the image data 6 by shifting the collating range in the image data 6 by one pixel at a time (indicated by the arrows in FIG. 2C), and the result is stored in the memory 2.

The above template matching method involves the segmentation process for dividing an image into regions corresponding to the object or its constituents in the examination of attributes including the size, shape, concentration, hue and texture of the object in the image data 6, or in the identification of the object by use of the attributes. The image segmentation falls into two methods. The first method is the detection of the edges in the image, and it is intended to clarify the regions of the object by defining the border line which provides the profile of the object. The second method called "region segmentation" is the division of an image based on the assumption that the attribute such as the concentration, hue or texture is constant or varies smoothly within the object. Of the image segmentation processes based on the above template matching method, the first edge detection method is described in the above-mentioned publication "Digital Image Processing Engineering", pp. 72-79, and it will be described in the following with reference to FIGS. 3A and 3B.

In extracting a line of pixels of "1" in the x direction from the image data, the template data 7 as shown in FIG. 3A is set in the template memory 3 and the data 7 is collated with the image data of the drawing stored in the memory 2 by the arithmetic unit 1. The arithmetic unit 1 takes correlation between the image data 6 and template data 7 to determine the presence or absence of the line in the image data 6. In other words, in FIG. 3B, where the image data 6 is assumed to have a positional function of I(x, y) and the region 8 of the template data indicated by the dashed block is assumed to have positional coordinates of J(x, y), the arithmetic unit 1 implements the following operation for the template data.

$$J(x, y) = -\tfrac{1}{2} \cdot I(x, y) - \tfrac{1}{2} \cdot I(x+1, y) - \tfrac{1}{2} \cdot I(x+2, y) + \quad (1)$$
$$1 \cdot I(x, y+1) + 1 \cdot I(x+1, y+1) + 1 \cdot I(x+2, y+1) -$$
$$\tfrac{1}{2} \cdot I(x, y+2) - \tfrac{1}{2} \cdot I(x+1, y+2) - \tfrac{1}{2} \cdot I(x+2, y+2) \ldots$$

(A symbol "·" indicates a multiplication.)

The result of operation for the above equation (1) is quantized to binary data, and a binary image of the line in the x-axis direction extracted from I(x, y) is obtained. The calculation of equation (1) is implemented for the entirety of the image data 6 by moving the region 8 of template data by one pixel at a time on the image data 6. J(x, y) obtained as a result of the operation or the binary image obtained by quantization is stored in the memory 2.

A determination process by a conventional pattern recognition system for more intricate patterns is described in detail in publication entitled "Introduction to Computer Image Processing", pp. 148-153, written by Takashi Matsuyama in this part under the supervision of Hideyuki Tamura, edited by Nihon Kogyo Gijutsu Center and published on Mar. 10, 1985 by Souken Shuppan.

This process for recognizing an intricate pattern will be described in brief with reference to FIGS. 4A-4E and FIGS. 5A-5C. In recognizing a specific pattern 10 shown in FIG. 4A by the template matching method, template data 11 (shown in FIG. 4B) is set in the template memory 3, and it is collated by the arithmetic unit 1 with initial binary image data 6 (shown in FIG. 5A) of the object stored in the memory 2. In such a case of recognizing an intricate pattern as the pattern 10, partial pattern templates 12 and 13 derived from the pattern 10 are introduced and the presence of the pattern 10 is determined from the total recognition results for the templates 12 and 13.

FIG. 4E shows reference pixels O, $O_1$ and $O_2$ of the pattern 10. The reference pixel O represents the template data 11 shown in FIG. 4B, the reference pixel $O_1$ represents the partial pattern template 12 shown in FIG. 4C, and the reference pixel $O_2$, represents the partial pattern template 13 shown in FIG. 4D.

Template matching with the pattern templates 12 and 13 will be described with reference to FIGS. 5A, 5B and 5C. For the image data 6 shown in FIG. 5A, template matching with the partial pattern templates 12 and 13 shown in FIGS. 4C and 4D results in binary data indicative of the partial pattern locations as shown in FIGS. 5B and 5C. These points shown in FIGS. 5B and 5C are pixels $b_1$, $b_2$, $c_1$ and $c_2$ as a result of recognition for both partial patterns. In general, a pattern is recognized using partial patterns of n in number.

For the partial pattern location binary data $B_{ei}(x, y)$ indicative of the presence of the i-th partial pattern at coordinates $A(x, y)$ in the object image data, if the reference pixel of the partial pattern i exists at pixel $(x, y)$, it results in $B_{ei}(x, y)=1$; otherwise, $B_{ei}(x, y)=0$. Determination of the object pattern is made through the judgement of the final pattern location binary data $B_{ee}$ for all pixels basing on the following equation (2), with a partial pattern reference pixel having coordinates $(x_i, y_i)$ with respect to the reference pixel of the object pattern.

$$B_{ee} = \sum_{i=1}^{n} B_{ei}(x + x_i, y + y_i) \quad (2)$$

The partial patterns 12 and 13 of FIGS. 4C and 4D produce coordinates $A(x, y)$, $B_{e1}(x_1, y_1)$ and $B_{e2}(x_2, y_2)$ of the object image data, and $(x_1, y_1)$ and $(x_2, y_2)$ become the reference pixels $O_1$ and $O_2$ with respect to the reference pixel O.

Since the equation (2) involves summation of n times, the number of operations for a field of 1000-by-1000 pixels is 1,000,000×n, and this means that the arithmetic unit 1 with an ability of 1,000,000 operational cycles per second, for example, expends n seconds. Namely, for n=2 it takes 2 seconds, and for n=4 it takes 4 seconds to achieve the operational result.

However, the foregoing conventional pattern recognition system having the structure as mentioned above and operating in the template matching manner as described above expends enormous time for the arithmetic operation implemented by the arithmetic unit in order to identify a specific pattern in image data. For example, when the template data 5 in the example of FIG. 1 and FIGS. 2A-2C includes 1000-by-1000 pixels, the number of operations needed will be approximately 1,000,000,000 times, and the total operation will take 1,000 seconds with the arithmetic unit 1 having an arithmetic ability of 1,000,000 operational cycles per second.

In another example of FIG. 1 and FIGS. 3A-3B, if the template data 7 has 3-by-3 pixels and the image data 6 has 1000-by-1000 pixels, the number of operations will be 9,000,000 times. Accordingly, the arithmetic unit 1 having an ability of 1,000,000 operational cycles per second will expend 9 seconds for the matching process.

In order to reduce the time consumption for the operation, it necessitates a proprietary hardware device as disclosed in article entitled "Development of LSI for Binary Image Matching" by Ishikawa and Hoshino, in the proceeding of the 1986 national convention of Institute of Electronics and Communication Engineers of Japan, lecture number 1295.

Besides the above publication, prior art references (written in English) on pattern recognition based on the template matching method are as follows:
(1) A. Rosenfeld & A. C. Kak: "Digital Picture Processing", 2nd edition, Academic Press (1982), Section 9.4 (Vol. 2, pp. 36–49); Section 10.3.1 and 10.3.2 (Vol. 2, pp. 113–121)
(2) E. L. Hall: "Computer Image Processing and Recognition", Academic Press (1979), Section 8.1.2-4 (pp. 480–487)
(3) G. J. Vanderbrug & A. Rosenfeld: "Two-Stage Template Matching", IEEE Transactions on Computers, (Vol. c-26, No. 4, pp. 384–393)
(4) Philip M. Merlin and David J. Farber: "A Parallel Mechanism for Detecting Curves in Pictures", IEEE Transactions on Computers, Vol. C-24, January 1975, pp. 96–98.

SUMMARY OF THE INVENTION

An object of this invention is to provide a pattern recognition system which is capable of identifying a specific pattern in the image data in a short time using existing hardware devices.

Another object of this invention is to provide a pattern recognition system which is capable of identifying a specific pattern such as a pattern concerning lines edges or profiles extracted from the image data without using expensive proprietary hardware.

A further object of this invention is to provide a pattern recognition system which is capable of detecting, in a short time, the presence of an object pattern based on the partial pattern location binary image data that indicates the presence of the object pattern.

In order to achieve the above objectives, the inventive pattern recognition includes the following components. A memory means stores the initial binary image data for identifying a specific pattern, logical operation designation data for prescribing the operational sequence and the type of logical operation used to identify the specific pattern, and the pattern location binary image data obtained as a final result of the logical operation. The initial binary image data is not confined to the inherent initial binary image data, but it may include a plurality of partial pattern location binary image data each indicating the presence of a partial pattern divided from a specific pattern in the inherent initial binary image data. The logical operation designation data, if desired, may include a plurality of shift vector data which prescribe the direction and distance of movement of the inherent initial binary image data to coincide with binary pixel data determined by the specific pattern.

A raster operation means operates based on the logical operation designation data to extract bit regions at which the above two binary image data correspond to each other and store the logical operation results in the memory means.

A processing means operates based on the operational sequence and logical operation prescribed by the logical operation designation data to perform the raster operation for the partial pattern location binary image data or shift vector data or the like in the case of a vector operation, thereby obtaining pattern location binary image data. In the case of a vector operation, if desired, the processing means may be formed of a transforming means which performs the raster operation between a plurality of first binary image data for raster operation at positions to which the inherent initial binary image data has been shifted in accordance with a plurality of shift vectors prescribed by the shift vector data and second binary image data for raster operation which are the initial binary image data and intermediate binary image data, using logical operations depending on specific pattern binary pixel date which belong to the shift vector data and repeats sequentially the process for obtaining intermediate binary image data to be used as second binary image data in the next cycle for a number of times prescribed by the shift vector data, thereby transforming the initial binary image data into the pattern location binary image data. The transforming means may be formed of a first transforming means which performs the raster operation depending on the specific pattern binary pixel data between the first binary image data for raster operation and the second binary image data for raster operation including the initial binary image data and the recognition intermediate binary image data and repeats sequentially the process for obtaining the recognition intermediate binary image data to be used as the second binary image data in the next cycle for a number of times prescribed by the shift vector data, thereby transforming the initial binary image data into the pattern location binary image data, and a second transforming means which performs the raster operation between a plurality of the third binary image data for raster operation at positions to which the pattern location binary image data has been shifted a plurality of times in the same distance and opposite direction relative to the shift for the initial binary image data by the first transforming means and the fourth binary image data for raster operation which are the pattern location binary image data and the intermediate restoration binary image data, and repeats the process for obtaining the intermediate restoration binary image data to be used as the fourth binary image data in the next cycle for a number of times prescribed by the shift vector data, thereby transforming the pattern location binary image data into pattern restoration binary image data.

BRIEF DESCRIPTION OF THE DRAWINGS

FIG. 1 is a block diagram showing an example of the conventional pattern recognition system;

FIGS. 2A, 2B and 2C are illustrations showing a pattern, template data and binary image data, respectively, for pattern recognition in the template matching manner using the pattern recognition system shown in FIG. 1;

FIGS. 3A and 3B are illustrations showing template data and binary image data, respectively, for template matching in the manner different from the manner of FIGS. 2A-2C;

FIGS. 4A-4E are illustrations showing a specific pattern such as the intricate recognition pattern, a template data, partial pattern template, and reference pixels of the specific pattern and partial pattern, respectively, for dealing with the template matching manner different from the manners of FIGS. 2A-2C and FIGS. 3A-3B;

FIGS. 5A, 5B and 5C are illustrations showing an image data, pixels of a partial pattern of a specific type, and pixels of a partial pattern of another type, respectively, for the template matching manner relevant to FIGS. 4A-4E;

FIGS. 21A-B, 22A-F, 23A-E and 24A-D are diagrams used to explain another example of the operation of the fourth embodiment of this invention, in which FIGS. 21A and 21B are diagrams for showing a specific pattern and specific pixels, respectively, in the fourth embodiment, FIGS. 22A-22F are diagrams used to explain the operation of the fourth embodiment, respectively, FIGS. 23A-23E are diagrams used to explain a logical operation in a stage of process by the fourth embodiment, and FIGS. 24A-24D are diagrams showing object patterns including noises encountered by the fourth embodiment;

FIGS. 25-27, 28A-D, 29, 30A-D and 31 are diagrams for the fifth embodiment of this invention, in which FIG. 25 is a block diagram showing the fifth embodiment of the inventive pattern recognition system, FIG. 26 is a diagram showing a specific pattern as an object of pattern recognition, FIG. 27 is a flowchart explaining the operation, FIGS. 28A-28D are diagrams used to explain the operation, FIG. 29 is a flowchart showing in detail the step ST42 of FIG. 27, FIGS. 30A-30D are diagrams showing the operation of the step ST43 of FIG. 27, and FIG. 31 is a flowchart explaining the step ST43;

FIGS. 36, 37A-D and 38A-C are diagrams used to explain a specific pattern encountered by the eighth embodiment of this invention, in which FIG. 36 is a diagram showing the specific pattern for extracting dotted lines, FIGS. 37A-37D are diagrams used to explain the operation for recognizing dotted lines of the eighth embodiment of this invention, FIGS. 38A, 38B and 38C are diagrams used to explain a variant operation for extracting dash-and-dot lines of the eighth embodiment;

FIGS. 42, 43A and 43B are diagrams used to explain the eleventh embodiment of this invention, in which FIG. 42 is a block diagram showing the system arrangement, and FIGS. 43A and 43B are diagrams showing specific patterns processed by the system.

DETAILED DESCRIPTION OF THE PREFERRED EMBODIMENTS

Preferred embodiments of the inventive pattern recognition system will be described in detail in the following.

Figure 6:
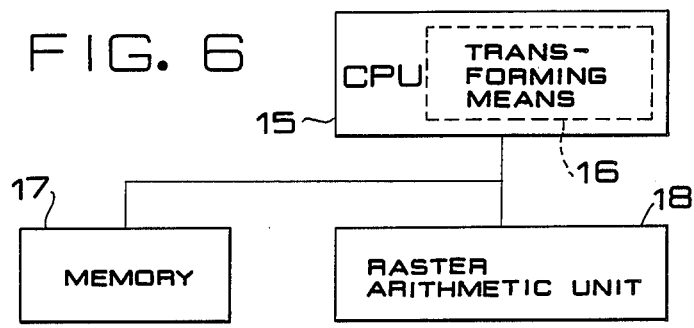
FIG. 6 is a block diagram showing the first embodiment of the inventive pattern recognition system.

FIGS. 6 through 11 are used to explain the first embodiment of this invention. In FIG. 6 showing in block diagram the arrangement of the first embodiment, the pattern recognition system includes a central processing unit (CPU) 15 incorporating a transforming means 16, a memory 17 for storing a data of a specific pattern used for the recognition of binary image data on a drawing and binary image data produced during and at the end of arithmetic operation, and a raster arithmetic unit 18 which implements the raster arithmetic operation. In the following discussion, binary image data and binary pixel data will be termed simply "image data" and "pixel data", respectively. The raster arithmetic operation is a function of transferring a bit data in a specified memory area to another area and implementing a logical operation with data in the destination area, and this unit is employed in apparatus such as a workstation (Refer to, J. D. FOLEY and A. VAN DAN, "Fundamentals of Interactive Computer Graphics", Addison Wesley, Reprinted with corrections March 1983, pp. 463-465.), for example. The raster arithmetic operation functions originally to carry out multi-window display and the like for the display unit.

For a transfer origination bit of A, a transfer destination bit of B and a logical operation of F, a raster operation implements the following operation defined by expression (3) at a rate of several mega-bytes per second.

$$B \leftarrow F(A, B) \qquad (3)$$

The literature on the raster arithmetic operation is, for example, "Programmer's Guide to DOMAIN Graphics Primitives", chapter 6, Apollo Computer Inc., 1984, which is the manual for Apollo workstation.

Figure 7:
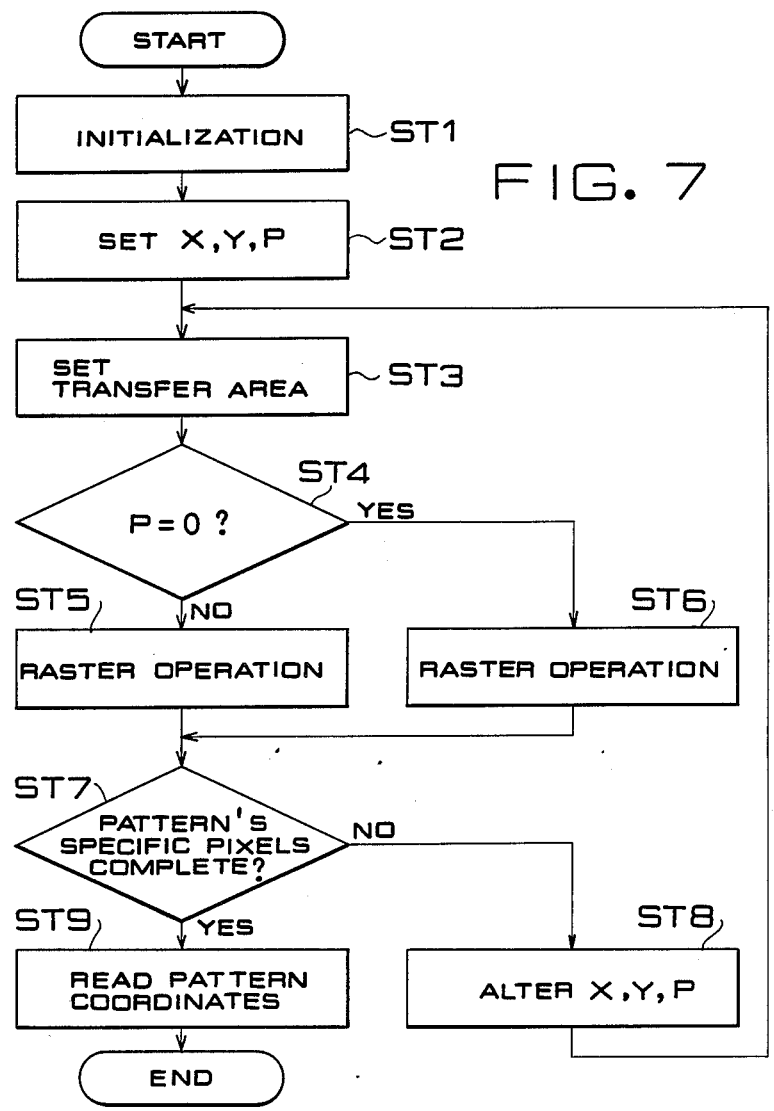
FIG. 7 is a flowchart used to explain the operation of the first embodiment shown in FIG. 6.
Figure 8A:
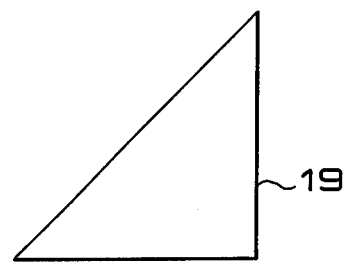
FIGS. 8A-B, 9A-C, 10A-C and 11A-D are diagrams used to explain the operation of the first embodiment.
Figure 8B:
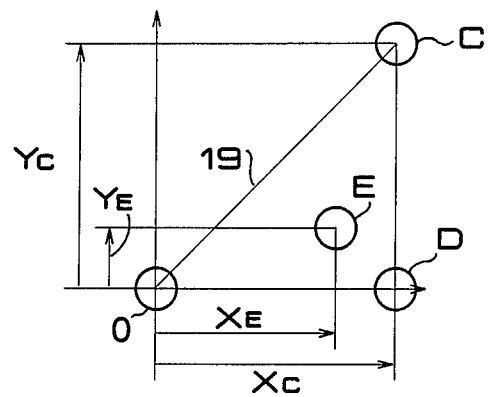

Next, the operation of this pattern recognition system will be described with reference to FIGS. 7 through 11D. FIG. 7 is a flowchart showing the sequence of processings carried out by the CPU 15, and FIGS. 8A and 8B are diagrams showing an example of the specific pattern to be identified wherein black is represented by "1" and white by "0".

Image data in which a specific pattern 19 is identified is initial image data A, data pertinent to the specific pattern 19 for prescribing the direction and distance of the shift for the initial image data A are shift vector data $S_i(i=1, 2, \ldots)$, binary pixel data (1 or 0) appended to the shift vector data $S_i$ and prescribing the type of logical operation between two image data are pixel data $P_i(i=1, 2, \ldots)$, an operational result indicating the position of the specific pattern 19, if exists, in the initial image data A is pattern location image data $B_e$, and the image data in intermediary of recognition is the intermediate image data $B_i(i=1, 2, \ldots)$.

The shift vector data $S_i(i=1, 2, \ldots)$ are determined by positional information of the specific pattern 19, and the pixel data $P_i(i=1, 2, \ldots)$ are determined by the value of pixels. The raster operation unit 18 is to implement a raster operation between the first image data for raster arithmetic operation and the second image data for raster operation. The first image data are the image data $A_i(i=1, 2, \ldots)$ produced as a result of shift for the initial image data A in accordance with the shift vector data $S_i(i=1, 2, \ldots)$, while the second image data are the initial image data A and the intermediate image data $B_i(i=1, 2, \ldots)$.

On the premise of the above setup conditions, the following describes each step of operation. Referring to the flowchart of FIG. 7, when the system starts operating, the system initialization takes place in step ST1. In this step, the system introduces positional information of a specific pattern T(x, y) including a reference pixel O and feature pixels C, D and E as shown in FIG. 8B. Next in step ST2, based on the initial image data A such as a drawing, the values of the reference and feature pixels O, C, D and E of the specific pattern 19 to be identified and the coordinates with respect to the reference pixel O, the system enters the shift vector data $S_i(i=1, 2, \ldots)$ and pixel data $P_i(i=1, 2, \ldots)$ into the memory 17. In this case, the specific pattern 19 may be a figure such as a rectangular equilateral triangle as shown in FIG. 8A, for example, and the pattern 19 is formed of four pixels including a reference pixel O and feature pixels C, D and E as shown in FIG. 8B. The shift vector data $S_i(i=1, 2, 3, 4)$ are the coordinates (X, Y) of the reference and feature pixels O, C, D and E with respect to the reference pixel O, i.e., O(0, 0), C($X_C$, $Y_C$), D($X_C$, 0), E($X_E$, $Y_E$), and the pixel data $P_i(i=1, 2, 3, 4)$ are values of the respective pixels, i.e., $P_1 = T(0, 0) = 1$, $P_2 = T(X_C, Y_C) = 1$, $P_3 = T(X_C, 0) = 1$, $P_4 = T(X_E, Y_E) = 0$. These shift vector data $S_i$ and pixel data $P_i$ are stored in the memory 17 in step ST2.

Next, the memory 17 prepares an area for operational result data depending on the size of image data and initializes the area to "1" in step ST3. The step ST3 sets an area for a raster operation in terms of the coordinates X and Y. When image data (x, y) meets $0 \leq x \leq xm$ and $0 \leq y \leq ym$, the area is as follows. For x, $0 \leq x \leq xm - X$ when $X \geq 0$, or $-X \leq x \leq xm$ when $X < 0$. For y, $0 \leq y \leq m - Y$ when $Y \geq 0$, or $-Y \leq y \leq ym$ when $Y \leq 0$. Step ST4 tests the value of pixel data $P_i$, and if $P_i = 1$ (i.e., $P_i \neq 0$), the sequence proceeds to step ST5, or if $P_i = 0$, the sequence proceeds to step ST6.

Step ST5 implements the raster arithmetic operation based on the following expression (4) for the image data.

$$B(x, y) \leftarrow A(x+X, y+Y) \cdot B(x, y) \qquad (4)$$

where A(x, y) represents the first image data for raster operation which are pixels of the initial image data A, and B(x, y) represents pixels of area of memory 17 in which the operational result data is stored and they are the second pixel data for raster operation called intermediate image data. Variables x and y are coordinates of the image data and operational result data, and symbol "·" indicates the logical-product operation.

Figure 9A:
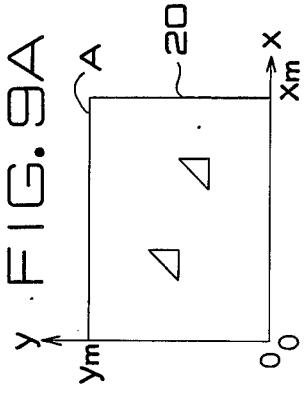
Figure 9B:
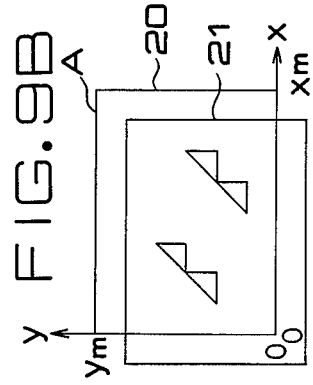
Figure 9C:
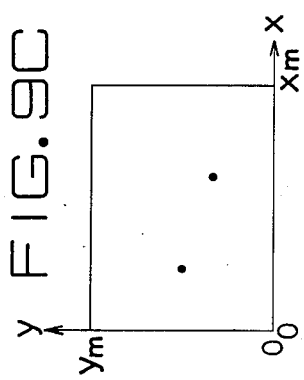

The fundamental processings of the above operation will be described using FIGS. 9A-9C. FIG. 9A shows an examples of the initial image data A, which includes the specific pattern 19 of FIG. 8A, FIG. 9B explains A(x+X, y+Y) for the pixel C in FIG. 8B, and FIG. 9C shows the result of operation.

Operation of the image data A(x, y) shown in FIG. 9A for the pixel C in FIG. 8B results in coordinates ($X_C$, $Y_C$) of the pixel C with respect to the reference pixel O and a value of $P_2 = 1$. From $\vec{OC} = (X_C, Y_C)$, shift vector data $S_2$ results in $-\vec{OC} = (-X_C, -Y_C)$, and placement of the image data A(x, y) over image data A(x+$X_C$, y+$Y_C$) which is the image data A shifted by $-\vec{OC}$ will result as shown in FIG. 9B. In the figure, reference number 20 indicates the image data A(x, y), and 21 indicates the A(x+$X_C$, y+$Y_C$). At pixel ($x_0$, $y_0$) which becomes the reference pixel of the pattern on the image data, A($x_0$+$X_C$, $y_0$+$Y_C$) takes "1". Accordingly, if a specific pixel (x, y) on the pattern is "1", the reference pixel of the pattern may possibly exist at the pixel where A(x+X, y+Y) takes "1". By implementing the operation of expression (4) for the preceding operation result data B(x, y), pixels with the possibility of being the reference pixel are left in the state of "1" in the B(x, y). Execution of the expression (4) for pixel O of B(x, y) which has been initialized to "1" results in the equality of B(x,y) to A(x,y). The result of execution of expression (4) for pixel C of B(x, y) is the intermediate image data shown in FIG. 9C. The area set in step ST3 is the whole image data in the operation of the pixel O, or it is the area made by overlapping of 20 and 21 in FIG. 9B in the operation of the pixel C.

Step ST6 implements the following raster arithmetic operation.

$$B(x, y) \leftarrow \overline{A(x+X, y+Y)} \cdot B(x, y) \quad (5)$$

where $\overline{A(x+X, y+Y)}$ signifies the negation of A(x+X, y+Y).

Figure 10A:
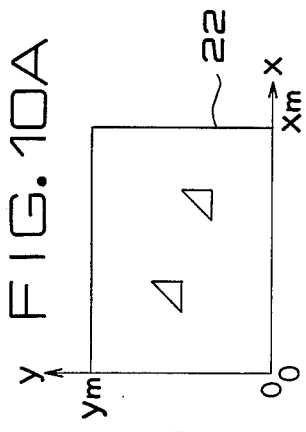
Figure 10B:
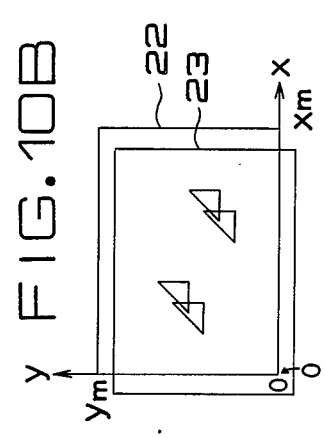
Figure 10C:
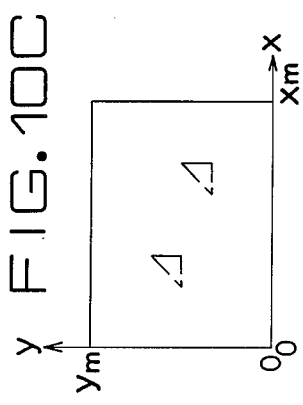

The fundamental processing for the above operation will be described in connection with FIG. 10, in which FIG. 10A shows image data, FIG. 10B explains $\overline{A(x+X, y+Y)}$ for pixel E in FIG. 8B, and FIG. 10C shows the result of operation. The pixel E has coordinates ($X_E$, $Y_E$) with respect to 0, and its value is $P_E = 0$. From $\vec{OE} = (X_E, Y_E)$, the shift vector data $S_E$ is $-\vec{OE} = (-X_E, -Y_E)$, and placement of the image data A(x, y) over image data A(x+$X_E$, y+$Y_E$) which is the image data A shifted by $-\vec{OE}$ results as shown in FIG. 10B. Reference number 22 indicates A(x, y), and 23 indicates A(x+$X_E$, y+$Y_E$).

At pixel ($x_0$, $y_0$) which becomes the reference pixel of the pattern on the image data, A($x_0$+$X_E$, $y_0$+$Y_E$) becomes "0". Accordingly, if a specific pixel (X, Y) on the pattern is "0", the reference pixel of the pattern may possibly exist at pixel (x, y) on the image data where A(x+X, y+Y) is "0". By implementing the operation of expression (5) for the preceding operation result data B(x, y), pixels with the possibility of the reference pixel are left in the state of "1" in the B(x, y). The result of execution of expression (5) for E of B(x, y) is the intermediate image data shown in FIG. 10C.

Step ST7 tests the completion of operation for all specific pixels of the pattern, and then the sequence proceeds to step ST9. In this step, the CPU 15 reads the coordinates of 1's pixels from the pattern location image data $B_e$ which is the result of operation, and the process is terminated with the readout coordinates being made the coordinates of the recognized pattern. If there are additional pixels, step ST8 alters X, Y and P to information for the next specific pixel, and the sequence proceeds to step ST3.

Pattern recognition performed by this system is shown in FIG. 11. In an initial image data A shown in FIG. 11A, the specific pattern shown in FIG. 8A is identified. Operation of the image data A for the pixel O in FIG. 8B results in an intermediate binary image data $B_1$(x, y) equal to FIG. 11A. Further operation for pixel C results in a transformation to image data $B_2$ shown in FIG. 11B. Further operation for pixel D results in a transformation to image data shown in FIG. 11C. Further operation for pixel E provides pattern location image data shown in FIG. 11D as the result of operation. Pixels including the reference pixel of the pattern shown in FIG. 8A are left in "1", and by reading the coordinates of "1", the specific pattern is identified. The coordinates of 1's pixels are outputted as the coordinates of the identified pattern. In specifying specific pixels on the pattern, pixels which feature the pattern in relation with image data are chosen. The operations of expressions (4) and (5) and steps ST5 and ST6 can be implemented rapidly by the raster arithmetic unit 18. For example, for the image data including 1000-by-1000 pixels, the raster arithmetic unit with the ability of 1M bytes per second takes about 0.1 second for the operation of one specific pixel on the pattern, and about one second is expended for the operation when ten pixels are specified on the pattern. In another example, when all pixels of a pattern including 32-by-32 pixels are specified as specific pixels, the time expended for the operation is about 100 seconds. The processing time can be reduced by the specification of specific pixels on a pattern and the execution of raster operation.

In the above first embodiment of this invention, the steps ST3 through ST8 function as the transforming means 16 for transforming the initial image data A into the pattern location image data $B_e$. Since the feature pixels O, C, D and E for a specific pattern are formed of four pixels, the shift vector data S is made up of and $\vec{OC}$, $\vec{OD}$ and $\vec{OE}$. However, in general, when the shift vector data S is made up of n in number, the transforming means 6a implements the raster arithmetic operation between $A_1$ and $B_0$ to obtain $B_1$, implements the raster operation between $A_2$ and $B_1$ to obtain $B_2$, implements the raster operation between $A_3$ and $B_2$ to obtain $B_3$, and so on until it implements the raster operation between $A_n$ and $B_{n-1}$ to obtain $B_e$, thereby transforming the initial image data A to the pattern location image data $B_n$ corresponding to the pattern presence position binary image data $B_e$. $A_i$ is shifted image data of A for the i-th feature pixel.

Although in the above first embodiment B(x, y) is initialized to "1", it may be dependent on the value of the reference pixel of the pattern in such a way of initialization to the image data if the value is "1", or to the inverted image data if the value is "0".

In the first raster operation, if P is 1, the following expression may be executed:

$$B(x, y) \leftarrow A(x+X, y+Y) \quad (6)$$

or if P is 0, the following expression may be executed:

$$B(x, y) \leftarrow \overline{A(x+X, y+Y)} \quad (7)$$

and in this case the B(x, y) need not be initialized.

For the B(x, y), a pixel in the existence of pattern is given "1", but it may be given "0" on the basis of reversal for "1" and "0".

The reference pixel may be set for each pattern, or same feature pixels may be set for all patterns.

The A(x, y) and B(x, y) may be stored in separate memories provided that the raster arithmetic operation is possible for them by the raster arithmetic unit 18. If the B(x, y) is stored in the memory of the display unit, the operational result can be displayed promptly on its screen.

For the reference pixel of a pattern, only setting may be made without the raster operation using the value of the pixel.

Although all specific pixels of a pattern are entered in the stage of initialization, they may be entered sequentially one pixel at a time prior to the step ST7 by the transforming means 16 of FIG. 6.

Although the process is terminated upon completion of operation for all specific pixels, it may be terminated upon judgement of the absence of specific pattern in response to the result of "0" for all pixels of $B_f(x, y)$.

Figure 12:
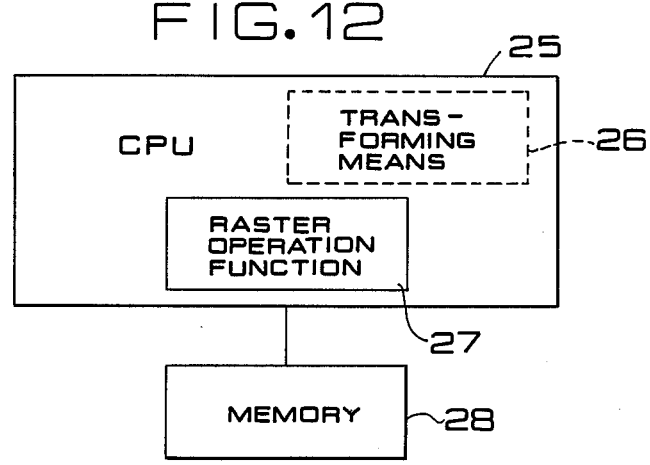
FIG. 12 is a block diagram showing the second embodiment of the inventive pattern recognition system.
Figure 11A:
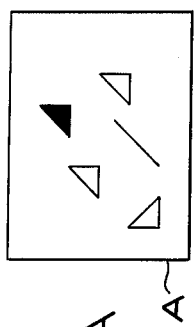
Figure 11B:
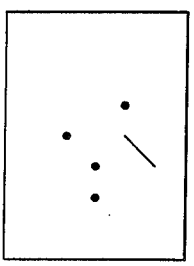
Figure 11C:
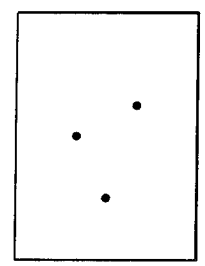
Figure 11D:
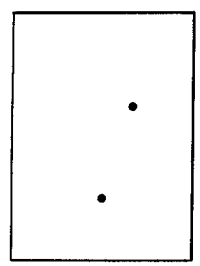
Figure 13:
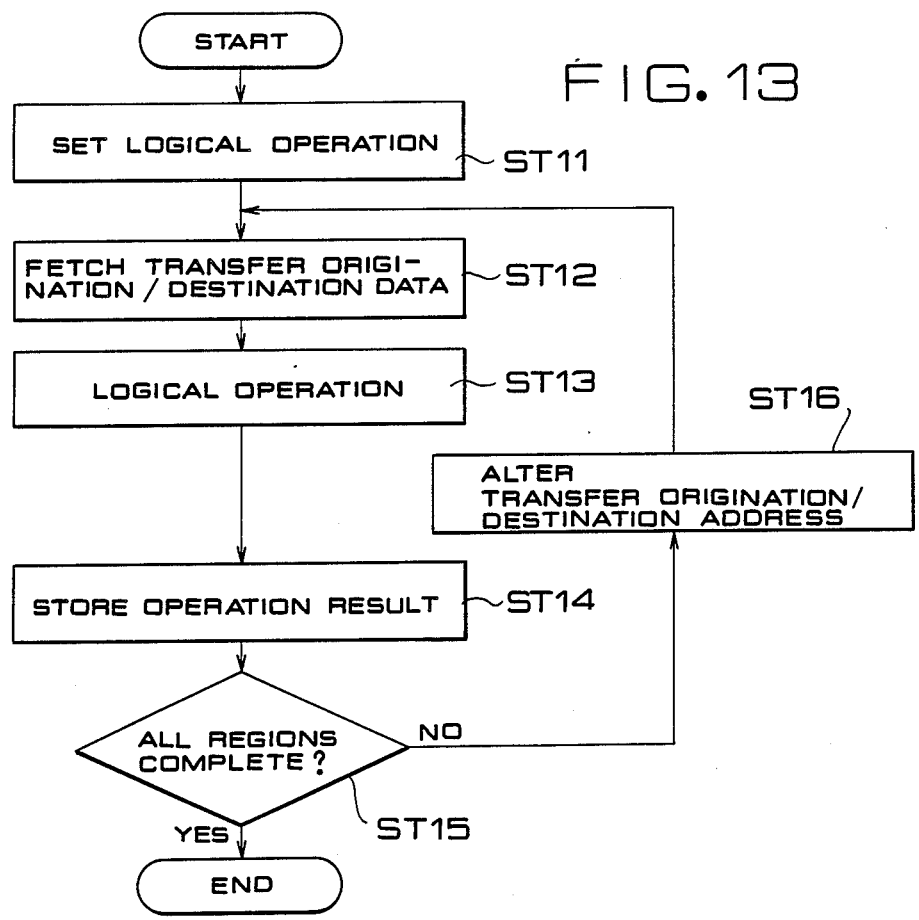
FIG. 13 is a flowchart used to explain an example of the operation of the second embodiment shown in FIG. 12.

FIG. 12 shows the second embodiment of this invention, in which the raster operation is implemented by the function of CPU, instead of providing the system with the raster operation unit 18. In the figure, reference number 25 denotes a CPU having a raster operation function, 26 denotes a transforming means, and 27 denotes a raster operation function unit in the CPU 25. FIG. 13 shows in flowchart the raster operation implemented by the CPU 25. Shown in FIG. 13 is equivalent to the steps ST5 and ST6 in the flowchart of FIG. 7. Step ST11 is to initialize the raster operation, in which the transfer origination address and transfer destination address of the image data are set. Step ST12 fetches transfer origination data and transfer destination data, step ST13 implements a logical operation, and step ST14 stores the result in the transfer destination address. Step ST15 tests whether the operation for the area set in step ST13 has been executed. If the operation for all pixels in the area is found complete, the raster operation terminates, otherwise the transfer origination and transfer destination addresses are revised in step ST16 and the sequence is returned to step ST12. These operations are implemented by the raster operation function 27 in the CPU 25. The logical operation executed in step ST13 is a logical-product operation between pixels of the transfer origination and destination given by expression (4) if the specific pixel is "1", or it is a logical-product operation between a negated pixel of the transfer origination and a pixel of the transfer destination given by expression (5) if the specific pixel is "0".

Figure 14:
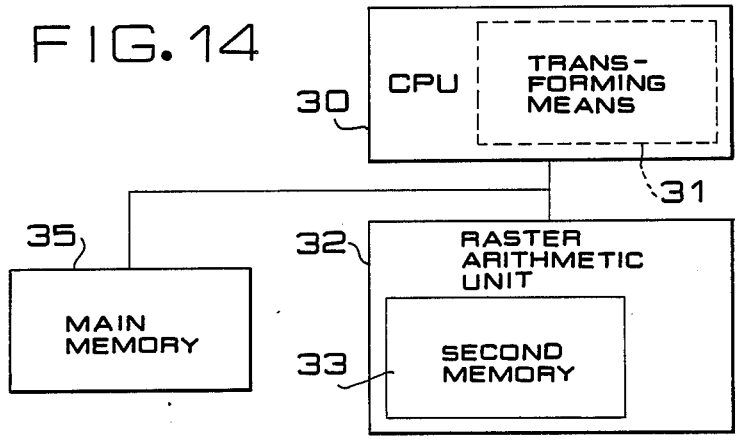
FIG. 14 is a block diagram showing the third embodiment of the inventive pattern recognition system.

The inventive pattern recognition system may be one as shown in FIG. 14 as the third embodiment, in which a memory 33 is incorporated within the raster arithmetic unit 32. In the figure, the pattern recognition system has a CPU 30 including a transforming means 31, and a main memory 35. The operation of the pattern recognition system, as the third embodiment of this invention, will be described in the following. The initial image data A is stored in the second memory 33 in the raster operation unit 32, and shift vector data S made up of feature pixels and pixel data P are stored in a main memory 35. Basing on the shift vector data S and pixel data P stored in the main memory 35, the transforming means 31 in the CPU 30 controls the type of operation implemented by the raster operation unit 32 and the storage area. The raster arithmetic unit 32 implements a raster operation for the image data stored in the second memory 33, and stores the operation result in the second memory 33.

Figure 15:
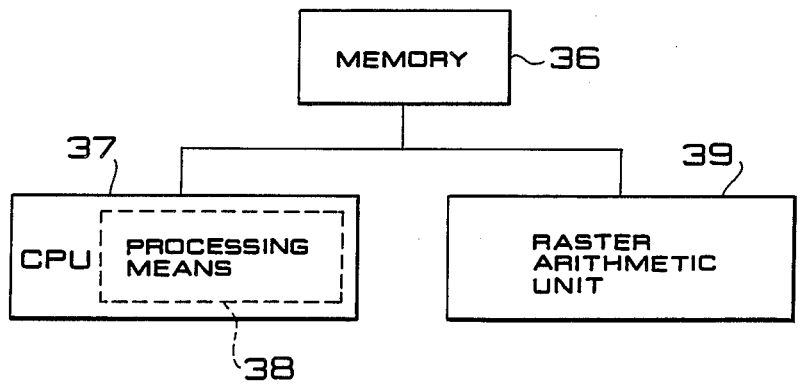
FIG. 15 is a block diagram showing the fourth embodiment of the inventive pattern recognition system.

Next, the fourth embodiment of this invention will be described with reference to FIG. 15. The pattern recognition system consists of a CPU 37 including a memory 36 and processing means 38, and a raster arithmetic unit 39, as shown. The raster arithmetic operation implements the operation based on the above expression (3).

The operation of the fourth embodiment pattern recognition system shown in FIG. 15 will be described using the flowchart of FIG. 16. Step ST21 is for system initialization, in which partial pattern location image data $B_{ei}$ (i=1, 2, ...) is stored in the memory 36 and an area for storing pattern location image data $B_{ee}$ which is the result of operation is reserved. These image data are binary image data as mentioned previously. Also set in this step is logical operation specification data L in terms of the number n of partial patterns divided from a specific pattern and the threshold value m at the judgement. The threshold value m is to recognize the presence of the specific pattern if partial patterns of m or more in number exist out of partial patterns of n in number. The logical operation specification data L is to dictate the operation of the following expressions (8) and (9), or their variants, for example. In the expressions, symbols "+" and "." signify logical-sum and logical-product operations, respectively.

$$B_{aj} = B_{ej1} \cdot B_{ej2} \cdot B_{ej3} \cdot \ldots \cdot B_{ejn} \quad (8)$$

$$B_e = B_{a1} + B_{a2} + \ldots B_{an}C_m \quad (9)$$

where $_nC_m$ is the number of combinations when taking m integers out of n integers ranging from 0 to n; j is the j-th combination when taking m integers out of n integers; $j_1, j_2, \ldots j_m$ are elements of the j-th combination, generally $j_k = 1, 2, \ldots, n$ (k=1, 2, ..., m).

The next step ST22 designates the image data and operational region for the raster operation. For the partial pattern location image data $B_{ei}$ (i=1, 2, ...), type of logical operation, and the partial pattern data in executing the operation specified by the logical operation specification data L, their shift values $(x_i, y_i)$ are prescribed by the processing means 38 in the CPU 37.

The next step ST23 executes the raster operation by the raster arithmetic unit 39 for the image data specified in the previous step ST22. Step ST24 tests the end of operation. If the operation is found complete, the sequence proceeds to step ST25, otherwise it returns to step ST22 for the region designation. Step ST25 reads out pattern pixels, i.e., pattern coordinates, from the pattern location image data $B_{ee}$ resulting from the process by the CPU 37.

As an example of the process by the processing means 38 in the CPU 37, suppose the case of the threshold m=3, where the pattern is recognized if three out of four partial patterns (n=4) are identified. Data $B_{ee}(x, y)$ indicative of the presence of the object pattern from partial pattern $B_{ei}(x, y)$ is expressed in logical-product (·) and logical-sum (+) operations as follows.

$$B_{ee}(x, y) = \quad (10)$$

$$B_{e1}(x + x_1, y + y_1) \cdot B_{e2}(x + x_2, y + y_2) \cdot B_{e3}(x + x_3, y + y_3) +$$

$$B_{e2}(x + x_2, y + y_2) \cdot B_{e3}(x + x_3, y + y_3) \cdot B_{e4}(x + x_4, y + y_4) +$$

$$B_{e3}(x + x_3, y + y_3) \cdot B_{e4}(x + x_4, y + y_4) \cdot B_{e1}(x + x_1, y + y_1) +$$

-continued $$B_4(x + x_4, y + y_4) \cdot B_{e1}(x + x_1, y + y_1) \cdot B_{e2}(x + x_2, y + y_2)$$

The expression (10) is reduced to as follows.

$$B_{ee}(x, y) = B_{e1}(x + x_1, y + y_1) \cdot B_{e2}(x + x_2, y + y_2) \cdot \quad (11)$$

$$\{B_{e3}(x + x_3, y + y_3) + B_{e4}(x + x_4, y + y_4)\} +$$

$$B_{e3}(x + x_3, y + y_3) \cdot B_{e4}(x + x_4, y + y_4) \cdot$$

$$\{B_{e1}(x + x_1, y + y_1) + B_{e2}(x + x_2, y + y_2)\}$$

Figure 17:
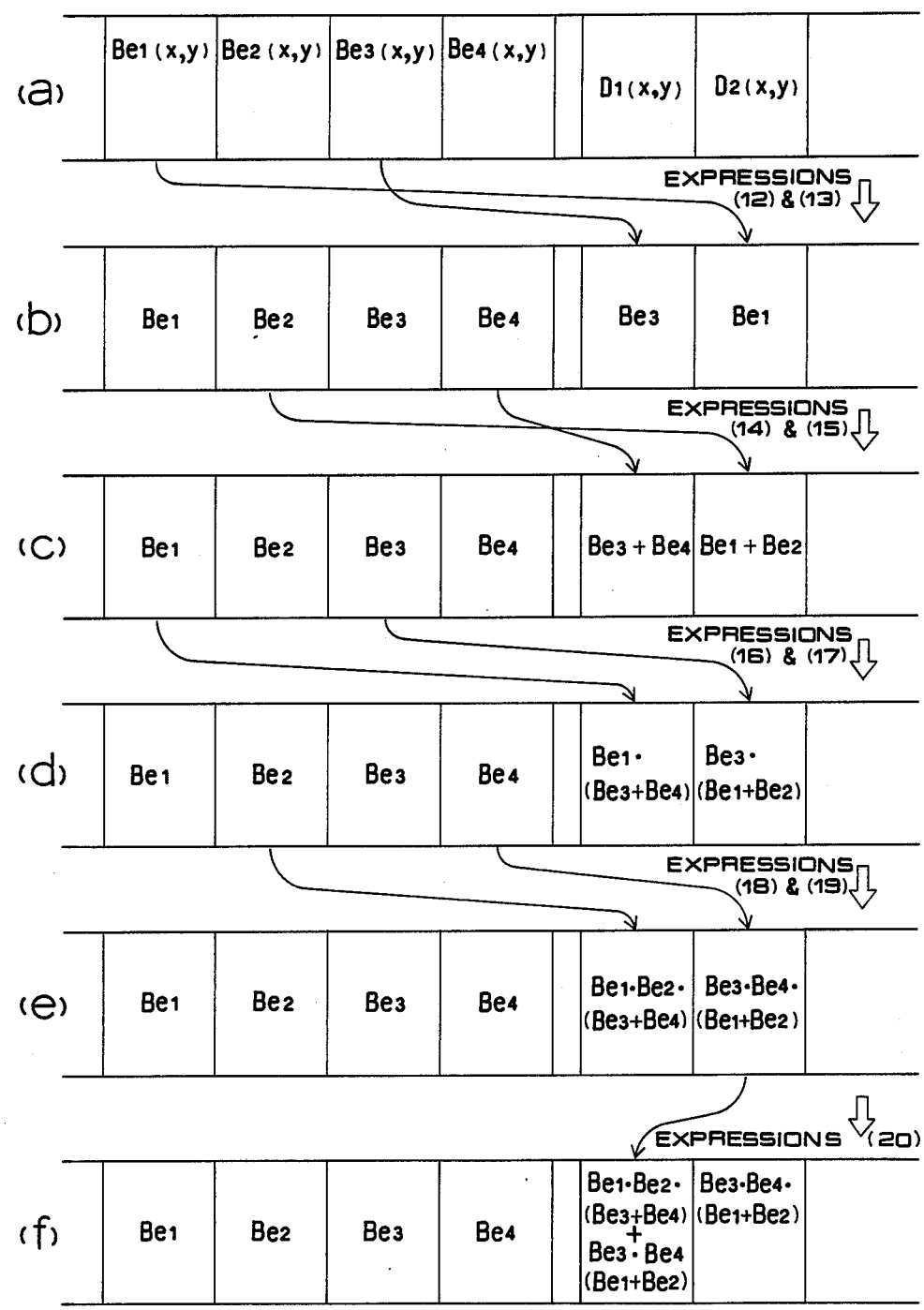
FIG. 17 is a set of diagrams used to explain the storing areas of the memory in the operation of the fourth embodiment.

The operation of expression (11) is carried out by the raster arithmetic unit 39 for each image data as shown in FIG. 17. Initially, areas $D_1(x, y)$ and $D_2(x, y)$ for storing the operation result are reserved in the memory 36 in step ST21. Next, the following operations take place.

$$D_1(x, y) \leftarrow B_{e3}(x+x_3, y+y_3) \quad (12)$$

$$D_2(x, y) \leftarrow B_{e1}(x+x_1, y+y_1) \quad (13)$$

The raster operation, i.e., data type of operation and area used for the operation, are set in step ST22. In the case of expression (12), the used data is $B_{e3}(x, y)$ and $D_1(x, y)$ and the type of operation is the arithmetic for transferring $B_{e3}(x+x_3, y+y_3)$ to $D_1(x, y)$. For the area of operation for the image data sized in X-by-Y, the x-dimension is set as $0 \leq x \leq X-x_1$ if $x_1 \geq 0$ or $-x_1 \leq x \leq X$ if $x_1 < 0$, and the y-dimension is set as $0 \leq y \leq Y-y_1$ if $y_1 \geq 0$ or $-y_1 \leq y \leq Y$ if $y_1 < 0$. Step ST23 transfers data for the operation of expression (12) by the raster arithmetic unit 39. Step ST24 tests the end of operation. The operations of expressions (12) and (13) are followed by (14) and (15):

$$D_1(x, y) \leftarrow D_1(x, y) + B_{e4}(x + x_4, y + y_4) \quad (14)$$

$$D_2(x, y) \leftarrow D_2(x, y) + B_{e2}(x + x_2, y + y_2) \quad (15)$$

followed by:

$$D_1(x, y) \leftarrow D_1(x, y) \cdot B_{e1}(x + x_1, y + y_1) \quad (16)$$

$$D_2(x, y) \leftarrow D_2(x, y) \cdot B_{e3}(x + x_3, y + y_3) \quad (17)$$

further followed by:

$$D_1(x, y) \leftarrow D_1(x, y) \cdot B_{e2}(x + x_2, y + y_2) \quad (18)$$

$$D_2(x, y) \leftarrow D_2(x, y) \cdot B_{e4}(x + x_4, y + y_4) \quad (19)$$

and finally the operation completes by the following expression.

$$B_{ee}(x, y) \leftarrow D_1(x, y) + D_2(x, y) \quad (20)$$

The $B_{ee}(x, y)$ is the pattern location image data indicating the presence of the object pattern. The expressions (12) through (19) are intended for logical operations by shifting each of $B_{e1}$ through $B_{e4}$, and the shift vector for prescribing the shift value is a vector having the reference point, i.e., reference pixel, of the partial pattern as a starting point and the reference point of the specific pattern as an ending point.

Figure 18:
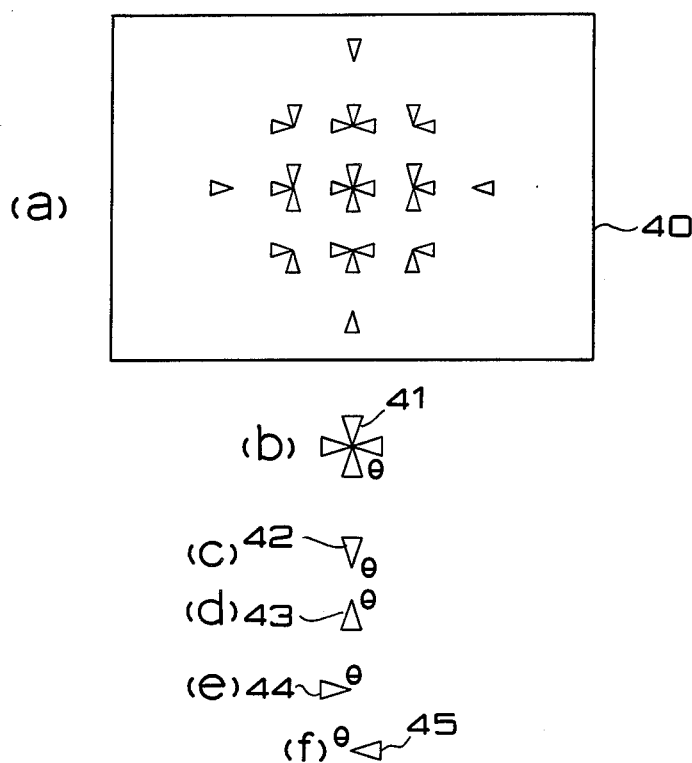
FIGS. 18 19A-D and 20A-I are diagrams used to explain an example of the operation of the fourth embodiment of this invention.
Figure 19A:
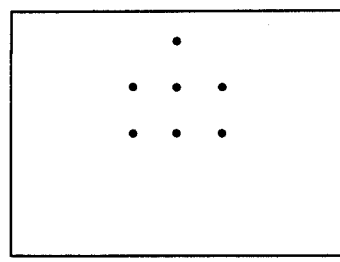
Figure 19B:
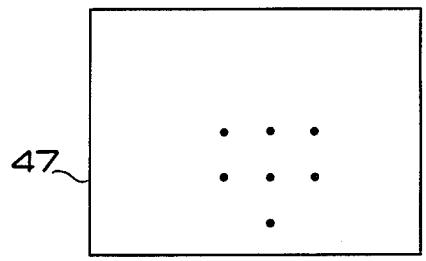
Figure 19C:
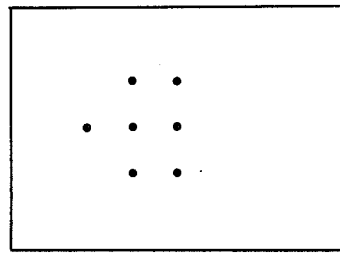
Figure 19D:
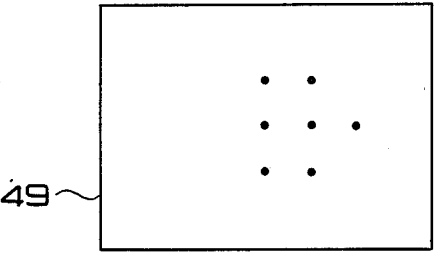
Figure 20A:
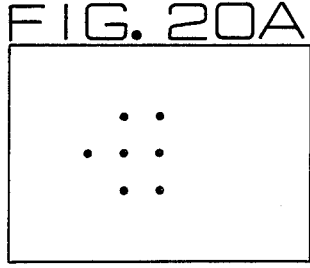
Figure 20B:
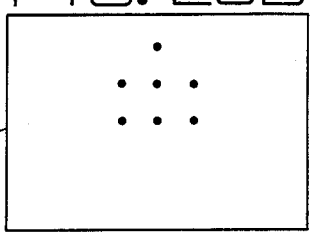
Figure 20C:
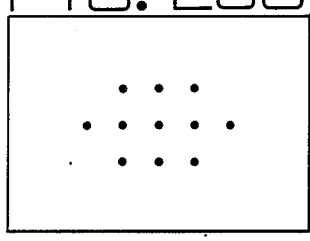
Figure 20D:
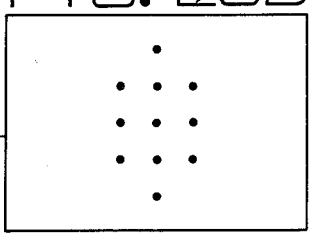
Figure 20E:
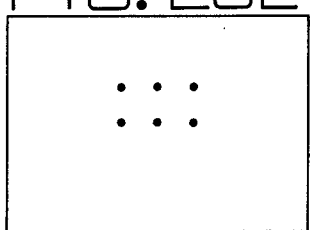
Figure 20F:
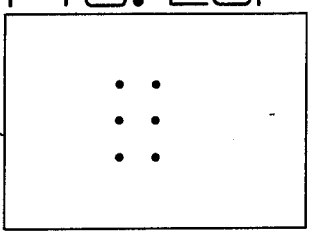
Figure 20G:
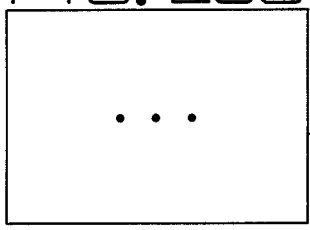
Figure 20H:
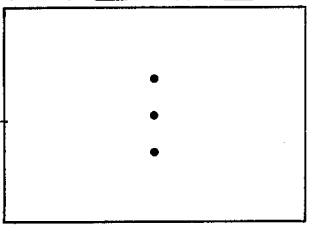
Figure 20I:
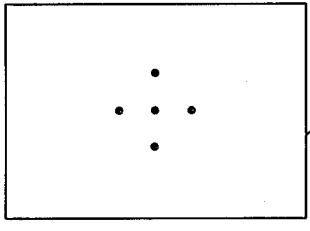

FIGS. 18, 19 and 20 show an example of the operation result. In FIG. 18, shown by 40 is an initial image data A(x, y), 41 is an object pattern to be identified, and 42, 43, 44 and 45 are partial patterns each having a reference pixel $\theta$. FIGS. 19A–19D show the partial pattern location image data $B_{ei}(x, y)$, in which numeral 46, 47, 48 and 49 indicate the presence of the respective partial patterns 42, 43, 44 and 45 of the initial image data A(x, y) 40. FIGS. 20A through 20I are diagrams showing the operation results. Shown by 50, 51, 52, 53, 54, 55, 56, 57 and 58 are the operation results ($D_1(x, y)$, $D_2(x, y)$) for the respective expressions (12), (13), (14), (15), (16), (17), (18), (19) and (20), with the partial pattern data 46, 47, 48 and 49 in FIGS. 19A–19D being $B_{e1}(x, y)$, $B_{e2}(x, y)$, $B_{e3}(x, y)$ and $B_{e4}(x, y)$, respectively. The image 58, as shown in FIG. 20I, is the pattern location image data $B_{ee}(x, y)$ as a final operation result. The CPU 37 reads the data 58, and extracts 1's pixels representing the presence of the pattern. In the fourth embodiment, the raster operations are conducted nine times from expression (12) to (20). Assuming the raster operation unit 39 to have an ability of 1M bytes per second, it takes the operation for 1000-by-1000 pixel data approximately 1 second.

Although in the above embodiment a pixel on a pattern is given "1" and a pixel outside of pattern is given "0", this state may be reversed.

Although the foregoing embodiment dealt with the example of pattern identification based on the setting of n=4 and m=3, in which the object pattern is identified when three out of four partial patterns are identified, the values of n and m may be varied provided that n is larger than or equal to m. In such cases, the expressions are generalized as follows:

$$B_{aj} = B_{ej1} \cdot B_{ej2} \cdot B_{ej3} \cdot \ldots \cdot B_{ejn} \quad (21)$$

$$B_e = B_{a1} + B_{a2} + \ldots + B_{an}C_m \quad (22)$$

where $_nC_m$ is the number of combinations when taking m integers from n integers ranging 1 through n; j is the j-th combination of taking m integers from n integers; and $j_1, j_2, \ldots j_m$ are elements of the j-th combination; $j_k = 1, 2, \ldots, n$ (k = 1, 2, \ldots, m).

It is possible to reform the above expressions (21) and (22) arbitrarily for the operation.

Although the above example took $D_1(x, y)$ and $D_2(x, y)$, if $B_{ei}(x, y)$ is not used in the following operations, the operation results may be stored in the area for $B_{ei}(x, y)$, thereby saving the storage area.

It is also possible to store $B_{ei}(x, y)$ in continuous areas so that image data in these areas are treated as the unitary data to be transferred or logically operated integrally in the raster operation.

Figure 16:
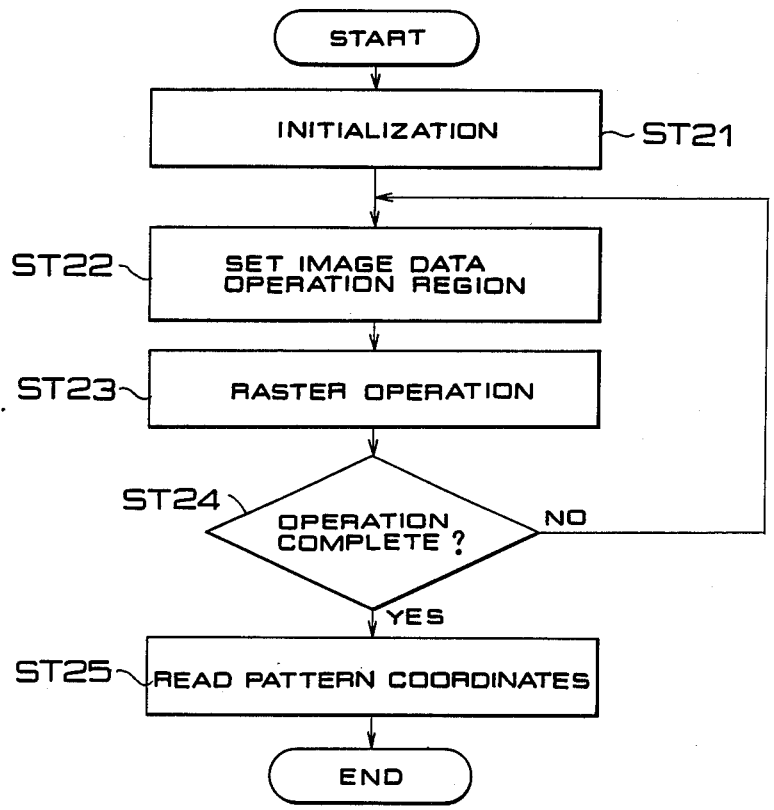
FIG. 16 is a flowchart used to explain the operation of the fourth embodiment shown in FIG. 15.

Although the logical operation designation data L includes the shift vector which prescribes the shift value for the partial pattern location binary image data $B_{ei}$ (i=1, 2, ..., n) in the logical operation by the raster operation unit, in addition to the operational procedure and the type of logical operation for the partial pattern location binary image data $B_{ei}$; i=1, 2, ..., n), if the reference pixels of all partial patterns are made coincident with the reference pixel of the object pattern, the need of shift is eliminated and the operation area become the whole image, and consequently the designation of operation area by the step ST22 of FIG. 16 is rendered unnecessary. The image data and the operation result data of partial patterns may be stored in different memories provided that the raster arithmetic operation by the raster arithmetic unit 39 is possible. Particularly, when the operation result data is stored in the memory within the display unit, the operation result can be displayed promptly.

The method of obtaining the partial pattern location image data ($B_{ei}$) from the initial image data A may be other than the template matching method.

By setting the logical expressions, various logical operations can be executed for pixels of the image data. For example, pixels of which m patterns out of n partial patterns are identified and n minus m partial patterns are not identified can be distinguished.

Figure 21A:
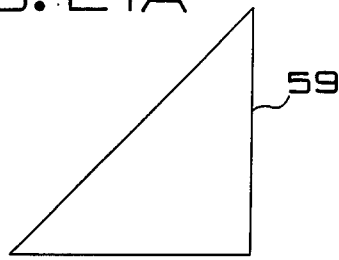
Figure 21B:
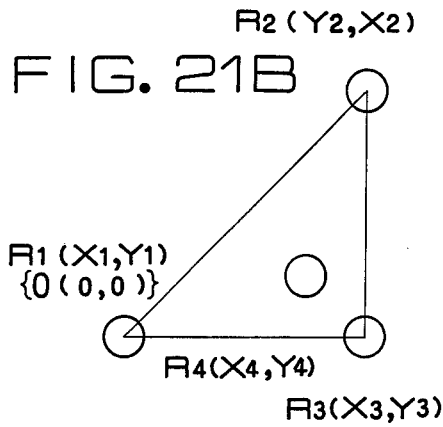
Figure 25:
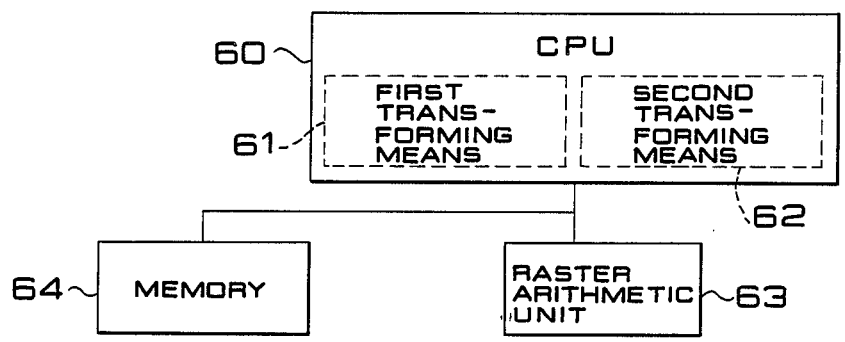

A partial pattern may be specific pixels. The following describes the operation of this case. First, the image data indicating the presence of specific pixels is made. FIG. 21A shows a specific pattern 59 to be identified in the object, and for this specific pixels $R_1$, $R_2$, $R_3$ and $R_4$ are set as shown in FIG. 21B. If the symbol O denotes the reference pixel of this pattern, the pixels have coordinates $R_1(X_1, Y_1)$, $R_2(X_2, Y_2)$, $R_3(X_3, Y_3)$ and $R_4(X_4, Y_4)$ with respect to the reference pixel O. The $R_i$ ($i=1, 2, 3, 4$) have values of $P_i$ ("1" or "0"). Image data indicative of the presence of the specific pixels is made according to the flowchart shown in FIG. 16 by this pattern recognition system. The step ST21 implements the initial setting, and the step ST22 fetches coordinates ($X_i$, $Y_i$) of a specific pixel and value $P_i$ of the pixel from the memory 36. The step ST23 sets the sort and region of raster arithmetic in the step ST24 by the CPU 37 for an initial image data of object of A(x, y) and an image data indicating the presence of partial pattern of D(x, y), the type of operation when $P_i$ is "1" is as follows:

$$D(x, y) \leftarrow A(x+X_i, y+Y_i) \quad (23)$$

or when $P_i$ is "0" it is as follows:

$$D(x, y) \leftarrow \overline{A(x+X_i, y+Y_i)} \quad (24)$$

where $\overline{A(x+X_i, y+Y_i)}$ stands for the negation of $A(x+X_i, y+Y_i)$. By transferring the A(x, y) while being shifted by $-X_i$ in the x-axis direction and by $-Y_i$ in the y-axis direction, the image data indicative of the presence of each specific pixel is such that the pixel located at the reference pixel O is "1" if a pixel coincident in value with the specific pixel exists. For x and y of the area, when pixel data has a size of X-by-Y, then $0 \leq x \leq X - X_i$ if $X_i \geq 0$, or $-X_i \leq x \leq X$ if $X_i < 0$, and $0 \leq y \leq Y - Y_i$ if $Y_i \geq 0$, or $-Y_i \leq y \leq Y$ if $Y_i < 0$.

The step ST23 carries out expressions (23) and (24) by the raster operation unit 39. The image data indicating the presence of each specific pixel is obtained by a single cycle of raster operation. On completion of all specific pixels, the resulting image data indicating the presence of the specific pixels $R_i$ are set to be $B_{ei}(x, y)$, and the sequence returns to the step ST22 for carrying out the expressions (12) through (20). For expression (11), the presence of pattern is determined based on $n=4$ and $m=3$, i.e., if three out of four specific pixels are coincident. At this time, the image data indicating the presence of specific pixel has been shifted to align with the reference pixel O of the pattern; therefore $X_i$, $Y_i$ ($i=1, 2, 3, 4$) is zero.

Figure 22A:
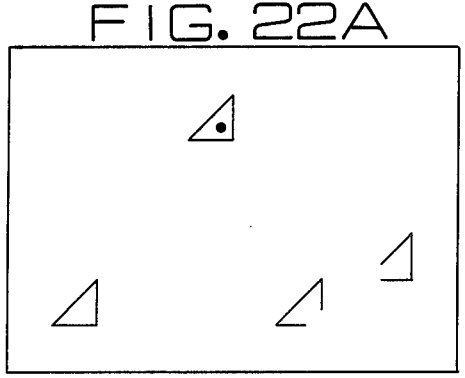
Figure 22D:
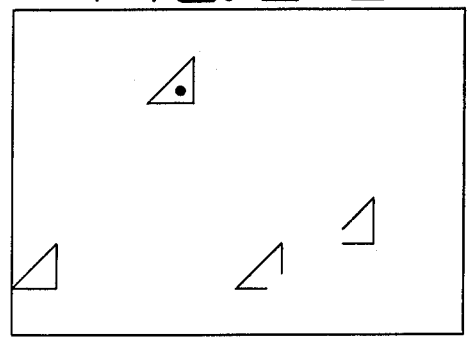
Figure 22B:
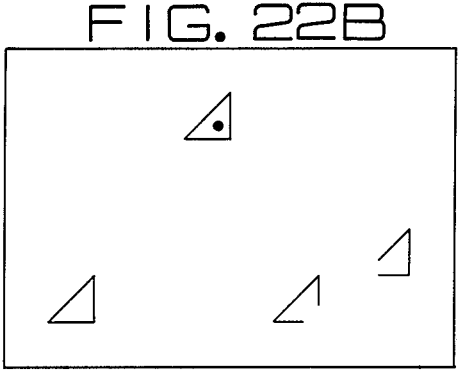
Figure 22E:
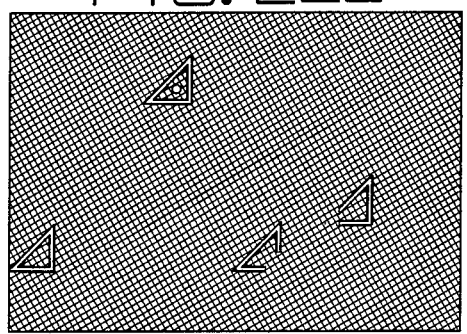
Figure 22C:
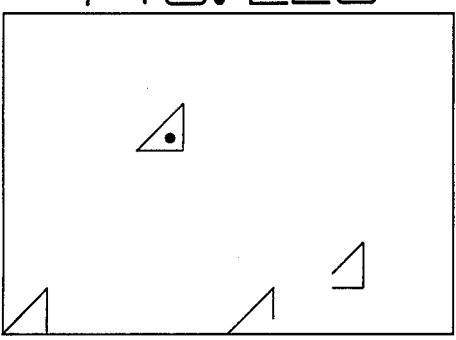
Figure 22F:
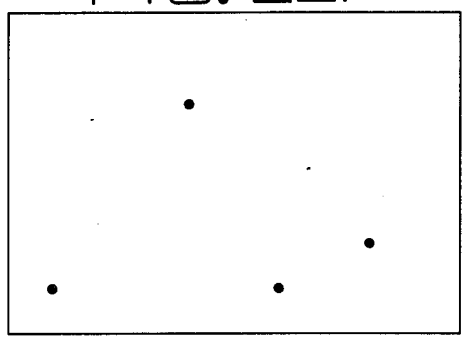

FIGS. 22A-22F show the result of pattern recognition. FIG. 22A shows the initial image data A for which pattern recognition is executed, and it includes the pattern shown in FIG. 21A to be identified. FIGS. 22B-22E show the partial pattern location image data $B_{ei}$ ($i=1, 2, 3, 4$) indicating the presence of the pixels $R_1$, $R_2$, $R_3$ and $R_4$, respectively, and FIG. 22F shows the result of recognition in which pixels in the presence of the pattern location image data $B_{ee}$ have 1's value as shown. The data of FIG. 22F is read by the CPU 37 in the step ST25.

By specifying the specific pixels distantly from one another and dispersedly out of a line, the pattern recognition is possible and immune from noises even if patterns line up.

Although in the foregoing operation $B_{e1}(x, y)$, $B_{e2}(x, y)$, $B_{e3}(x, y)$ and $B_{e4}(x, y)$ are reserved in the memory 36 as areas for the image data indicative of the presence of the partial patterns for pixels $R_1$, $R_2$, $R_3$ and $R_4$, $\overline{A(x+X_i, y+Y_i)}$ if the specific pixel is "1" or $A(x+X_i, y+Y_i)$ if the specific pixel is "0" may be in place of the $B_{ei}(x+X_i, y+Y_i)$ ($i=1, 2, 3, 4$) in the operations of the expressions (12), (13), (14), (15), (16), (17), (18), (19) and (20). By using the obtained image data as the partial pattern location image data indicative of the presence of partial patterns, the hierarchical recognition is made possible. Each level of recognition may have a different logical operation.

Figure 23A:
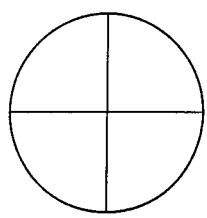
Figure 24A:
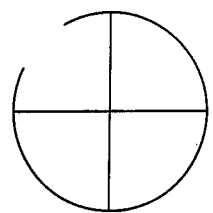

FIGS. 23A through 23E show an example of this case. FIG. 23A shows a pattern to be identified, and FIGS. 23B, 23C, 23D and 23E show pixels representing the partial patterns of the pattern shown in FIG. 23A. Indicated by small circles are specific pixels representing the partial patterns. Initially, the pattern recognition takes place for each of the specific pixels shown in FIGS. 23B, 23C, 23D and 23E.

Figure 23B:
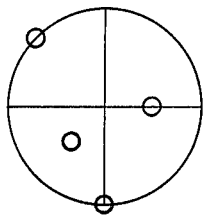
Figure 24B:
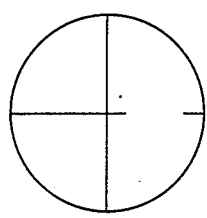
Figure 23C:
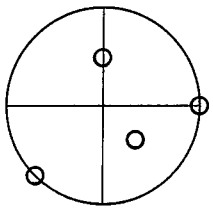
Figure 24C:
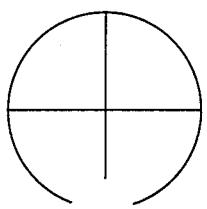
Figure 23D:
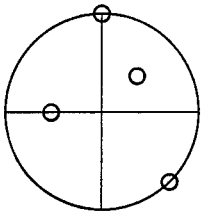
Figure 24D:
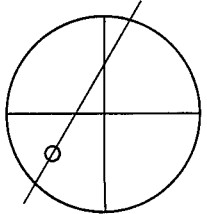
Figure 23E:
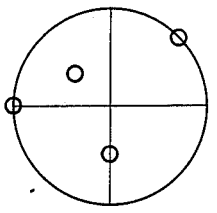

For the initial image data A, the partial patterns made up of four specific pixels are identified. For example, if all of the four specific pixels are coincident with the pixels of the partial patterns, the raster operation unit 39 implements the logical operation for determining the partial patterns. The recognition processes for FIGS. 23B, 23C, 23D and 23E produce four operation result image data in the memory 36. Using the four image data as the partial pattern location image data indicating the presence of partial patterns, the raster operation unit 39 implements the logical operation which determines the presence of the pattern of FIG. 23A if three out of four partial patterns exist, for example. This hierarchical pattern recognition enables recognition of an image data A even if it includes noises. FIGS. 24A through 24D show patterns with noises. The partial pattern of FIG. 23B is not identified on the patterns of FIGS. 24A through 24D due to noises on the specific pixels. However, the partial patterns of FIGS. 23C, 23D and 23E are recognizable; therefore the presence of the pattern of FIG. 23A is determined.

Next, the fifth embodiment of this invention will be described in detail with reference to FIGS. 25 through 31. The pattern recognition system of the fifth embodiment consists of a central processing unit (will be termed simply "CPU" hereinafter) 60, a first and second transforming means 61 and 62 processed in the CPU 60, a raster arithmetic unit 63, and a memory 64 for storing the binary image data of a drawing, data of a specific pattern to be extracted and intermediate and resulting binary image data. The raster operation implements bit logical operations, and the system is applied to a high-performance workstation, as mentioned previously.

Figure 26:
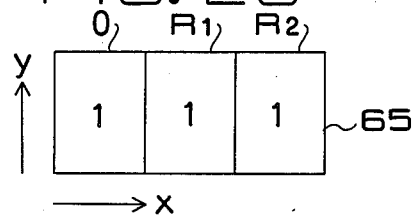

In this pattern recognition system, the binary image data from which the specific pattern is extracted is the initial binary image data A, and the data of specific pattern which prescribes the shift direction and distance for the alignment of the initial binary image data is shift vector data S. The shift vector data S is determined from positional information of the specific pattern and the value of pixels. For example, a specific pattern 65 for the line extraction in the x-axis direction is as shown in FIG. 26, and its shift vector data S is the coordinates of the reference pixel O and of 1's pixels $R_1$ and $R_2$ with respect to O, and these values are stored in the memory 64 in the first step of FIG. 27.

Figure 27:
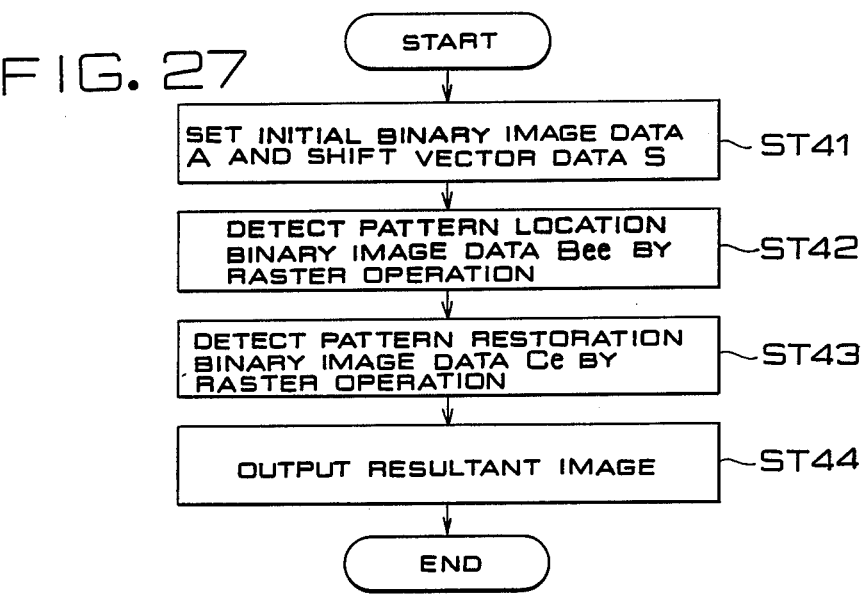

FIG. 27 shows in the flowchart the sequence of process implemented by the CPU 60. The following describes the operation of this embodiment in connection with FIG. 27. In the figure, the step ST41 sets initial values for the initial binary data A and shift vector data S. The initial image data A is binary ("0" or "1"), and it is represented by I(x, y), where $0 \leq x \leq xm$ and $0 \leq y \leq ym$. Step ST41 stores the I(x, y) as bit map data in the memory 64. Here, the operation is intended, for example, to extract a line made up of three or more consecutive 1's pixels lining up along the x-axis by using a specific pattern 65 shown in FIG. 26. Based on the specific pattern 65, step ST41 stores the shift vector data S, which are the coordinates of the reference pixel O and 1's pixels with respect to O, in the memory 64.

The step ST42 constitutes the first transforming means 61, in which the raster operation unit 63 implements the raster operation, searches for patterns which match the specific pattern 65 in the initial binary image data A, i.e., I(x, y), and extracts their reference points if such patterns are found. Image data extracted in the step ST42 forms extracted pattern existence binary data $B_e$.

Figure 28A:
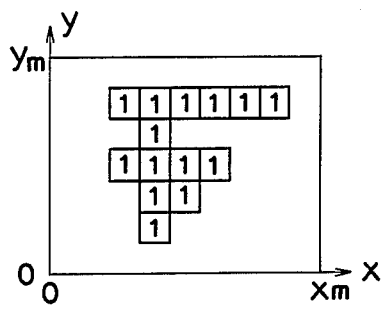
Figure 28B:
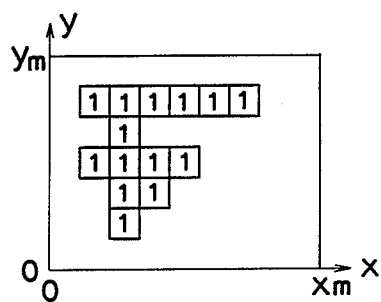
Figure 28C:
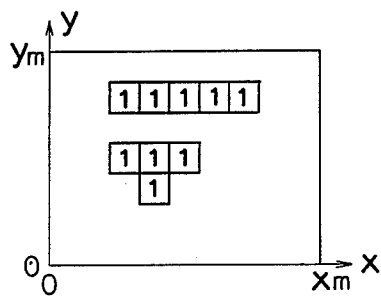
Figure 28D:
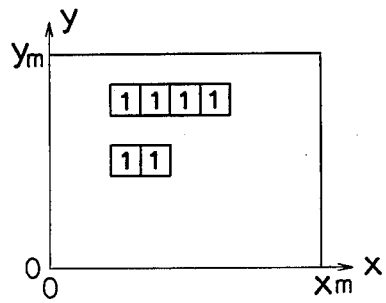

The operation of step ST42 will be described using FIGS. 28A-28D and FIG. 29. FIG. 28A shows an example of the initial binary image data A, i.e., I(x, y). Background pixels have value "0". From I(x, y), portions which match the specific pattern 65 shown in FIG. 26 are extracted. First, attention is paid to pixels O(0, 0) and $R_1$(1, 0) of the specific pattern 65. By the corresponding shift vector data $\vec{OR}_1 = (1, 0)$ of S, the data I(x, y) is shifted by the amount of $-\vec{OR}_1 = (-1, 0)$ to obtain the first binary image data $A_1$ for raster operation as shown in FIG. 28B. The initial binary image data A of FIG. 28A is the second binary image data for the raster operation and that of FIG. 28B is the first binary image data for the raster operation, and FIG. 28C shows intermediate binary image data $B_1$ for the extraction after a logical operation, i.e., logical-product operation in this case, between pixels of the image data A and $A_1$. In FIG. 28C, only portions where two or more 1's pixels line u along the x-axis on the image of FIG. 28A are given "1". This means the detection in FIG. 28A of pattern existing portions corresponding to the pixels O and $R_1$ of the specific pattern 65.

In the same way, for pixel $R_2$(2, 0) of the specific pattern 65, the initial binary image data A shown in FIG. 28A is shifted by the amount of $(-2, 0)$ to obtain the first binary image data $A_2$ for the raster operation. The image data $A_2$ and $B_1$ are taken logical product using the intermediate binary image data shown in FIG. 28C as the second binary image data for the raster operation, resulting in an intermediate binary image data shown in FIG. 28D. In the figure, portions where three or more 1's pixels line up along the x-axis in FIG. 28A are given "1". In this example, the specific pattern 65 is made up of three elements, and the above process provides extracted pattern existence binary image data $B_e$ with reference pixels having "1" in FIG. 28D if the specific pattern 65 exists in the data of FIG. 28A.

Figure 29:
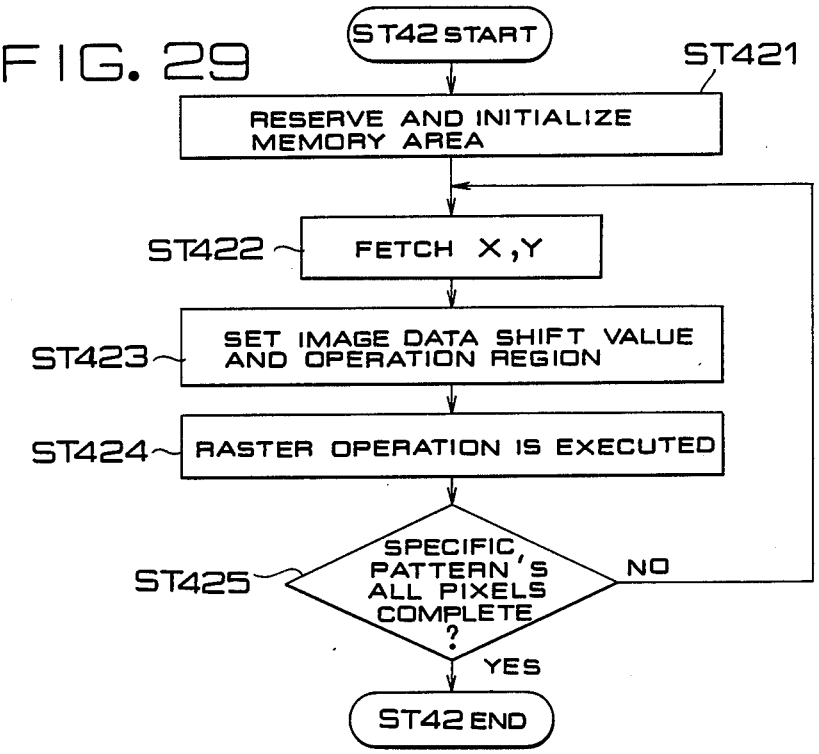

These operations are implemented in the raster operation. FIG. 29 shows in flowchart the operation of the step ST42 which is the first transforming means. Step ST421 reserves a bit map area $D_1(x, y)$, where $0 \leq x \leq xm$, and $0 \leq y \leq ym$, for storing the pattern existence binary image data $B_e$ in the memory 64, and initializes the area to "1". Step ST422 retrieves the shift vector data S from the memory 64. The next step ST423 sets the shift value for the initial binary image data A, i.e., I(x, y), for the next raster operation in the step ST424. From 1's pixel (x, y) on the specific pattern 65, the shift value is $(-x, -y)$. A region on the image data undergoing raster operation is also set. Based on the shift value and image data region, the CPU 60 controls the raster operation unit 63.

In step ST424, the raster operation unit 63 implements the following raster operation for I(x, y) and $D_1(x, y)$ in the memory 64.

$$D_1(x, y) \leftarrow I(x+X, y+Y) \cdot D_1(x, y) \quad (25)$$

the expression implies that I(x, y) is shifted by $(-x, -y)$ and the result is taken logical-product with $D_1(x, y)$. The region of operation ranges $0 \leq x \leq xm$ if $X \geq 0$ or $-X \leq x \leq xm$ if $X < 0$, and $0 \leq y \leq ym$ if $Y \geq 0$ or $-Y < y < ym$ if $y < 0$. $I(x+X, y+Y)$ stands for a pixel of the first binary image data $A_i$($i=1, 2, \ldots$) for the raster operation, and $D_1(x, y)$ stands for a pixel of the second binary image data for the raster operation.

Step ST425 tests whether or not the operation of expression (25) has been carried out for all 1's pixels on the specific pattern 65. If the operation for all pixels is found complete, the step ST42 is terminated, otherwise the sequence proceeds to the step ST422 again to go on the operation for the next 1's pixel of the specific pattern 65. The reference pixel O is also included for the operation. These are the operations of the step ST42, and as a result the initial binary image data A is transformed into the pattern existence binary image data $B_e$.

Figure 30A:
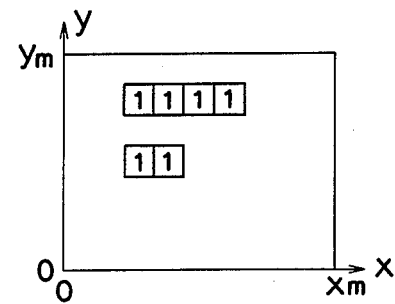
Figure 30B:
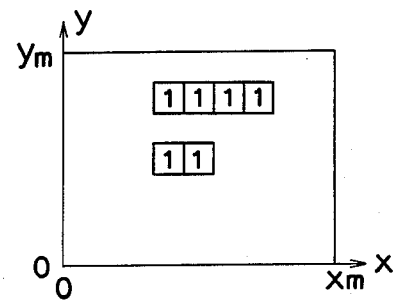
Figure 30C:
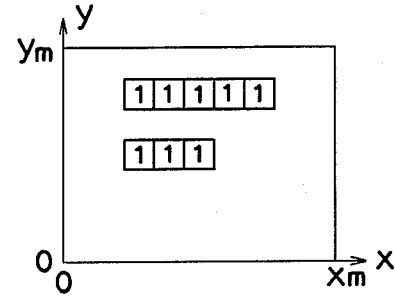

The next step ST43 is the second transforming means 62 for obtaining extracted pattern restoration binary image data $C_e$, which is the result of extraction, by restoring the specific pattern 65 on the image data from the pattern existence binary image data $B_e$ resulting from the step ST42. In the pattern existence binary image data $B_e$, i.e., $D_1(x, y)$, obtained in the step ST42, only the reference pixel of the specific pattern 65 is "1" when it exists in the initial binary image data A, i.e., I(x, y). Namely, in FIG. 28D, only the pixel at the position corresponding to the reference pixel O is "1" when the pattern 65 of FIG. 26 exists. On this account, the step ST43 set "1" for the pixel at the position corresponding to a 1's pixel ($R_1$, $R_2$) other than the reference pixel O of the specific pattern The operation of the step ST43 will be described using FIGS. 30A-30D and FIG. 31. FIG. 30A shows the pattern existence binary image data $B_e$, i.e., $D_1(x, y)$ obtained in the step ST42, and it is equal to FIG. 28D. First, attention is paid to pixels O(0, 0) and $R_1$(1, 0) of the specific pattern 65. By a corresponding $\vec{OR}_1 = (1, 0)$ of shift vector data S, $D_1(x, y)$ is shifted by the amount of $\vec{OR}_1 = (1, 0)$ to produce the third binary image data $B_{e1}$ for the raster operation. This shift operation is in the opposite direction and equal distance relative to the case of the initial binary image data A by the first transforming means, and it is shown in FIG. 30B. FIG. 30C shows tee image resulting from a logical operation, i.e., logical-sum operation in this case, between pixels of the fourth binary image data for raster operation, which is the pattern existence binary data $B_e$ shown in FIG. 30A and pixels of the third binary image data $B_{e1}$ for raster operation shown in FIG. 30B. In FIG. 30C, if the specific pattern 65 exists in FIG. 28A, its pixels corresponding to O and $R_1$ are "1". The image data produced by the logical-sum operation is restoration intermediate binary image data, and it becomes the fourth binary image data for the next raster operation.

Figure 30D:
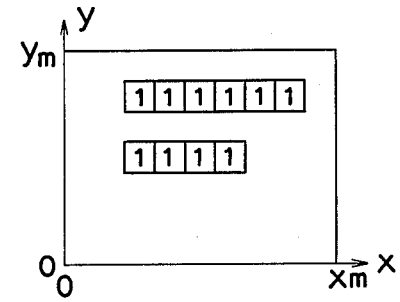

In the same way, for a pixel $R_2(2, 0)$ of the specific pattern 65, the third binary image data $B_{e2}$ for raster operation derived from FIG. 30A shifted by $\vec{OR}_2=(2, 0)$ is taken logical-sum with FIG. 30C. FIG. 30D shows the resulting restoration intermediate binary image data. Since the specific pattern 65 is made up of three pixels, the number of shifts prescribed by the shift vector data S is two, FIG. 30D becomes pattern restoration binary image data $C_e$ as a result of extraction of the specific pattern 65 in FIG. 28A. In FIG. 30D, all line-ups of three or more 1's pixels along the x-axis are extracted. Namely, lines along the x-axis are extracted. This operation is carried out by the raster operation unit 63.

Figure 31:
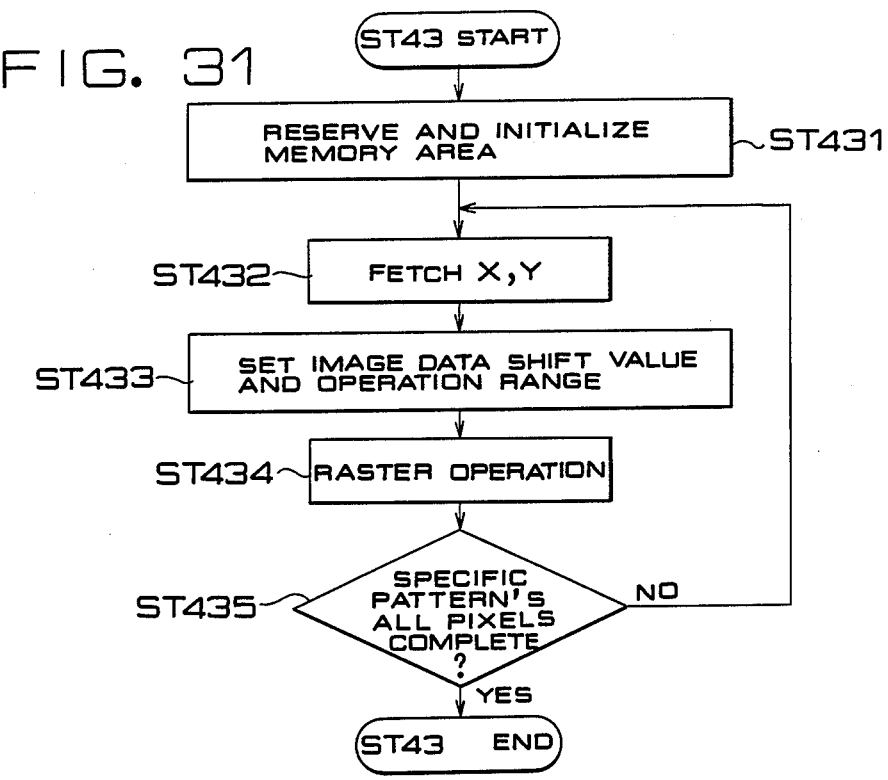

FIG. 31 shows in flowchart the operation of the step ST43 which is the second transforming means 62. In the step ST431 the CPU 60 reserves in the memory 64 a bit map area $D_2(x, y)$, where $0 \leq x \leq xm$ and $0 \leq y \leq ym$, for storing the pattern restoration binary image data $C_e$ as a result of extraction, and initializes the area to "0". Step ST432 retrieves the coordinates (x, y) of a pixel of the specific pattern 65 from the memory 64. The step ST433 sets the shift value for $D_1(x, y)$ for the execution of the raster operation by the raster arithmetic unit 63. The shift value is (x, y) based on the 1's pixel (x, y) on the specific pattern 65. The step ST434 operates on the raster arithmetic unit 63 under control of the CPU 60 to execute the following raster operation for $D_1(x, y)$ and $D_2(x, y)$ in the memory 64.

$$D_2(x, y) \leftarrow D_1(x-X, y-Y) + D_2(x, y) \qquad (26)$$

This expression implies that $D_1(x, y)$ is shifted by the amount of (x, y) and the result is taken logical-sum with $D_2(x, y)$. $D_1(x-X, y-Y)$ stands for a pixel of the third binary image data $B_{ei}(ei=e_1, e_2 \ldots)$ for raster operation, and $D_2(x, y)$ stands for a pixel of the fourth binary image data for raster operation. The operational region set in the step ST433 ranges: $X \leq x \leq xm$ if $X \geq 0$ or $0 \leq x \leq xm+X$ if $X<0$; and $Y \leq y \leq ym$ if $Y>0$ or $0<y<ym+Y$ if $Y<0$. The step ST435 tests whether or not all of 1's pixels on the specific pattern 65 have undergone the operation of expression (26). If it is found complete, the step ST43 is terminated, otherwise the sequence proceeds to the step ST432 to go on with the operation for the next 1's pixel on the specific pattern 65. The reference pixel O also undergoes the operation. These are the operations of the step ST43, and as a result the pattern existence binary image data $B_e$ is transformed into the pattern restoration binary image data $C_e$. In the step ST44, the CPU 60 takes out the pattern recognition binary image data $C_e$, i.e., $D_2(x, y)$, obtained in the step ST44 from the memory 64. In conclusion, lines made up of three or more consecutive 1's pixels along the x-axis in the initial binary image data A are extracted. Comparing FIG. 28A with FIG. 30D reveals that lines (sets of three or more consecutive 1's pixels) along the x-axis in the initial binary imaqe data A shown in FIG. 28A are extracted in FIG. 30D.

The operation of expressions (25) and (26) can be done in a short time by the raster operation unit 63. As described above, for the extraction using the specific pattern 65 in FIG. 26, it is enough to carry out the raster operation six times for the image data. When image data made up of 1000-by-1000 pixels is processed by the raster arithmetic unit 63 with the ability of 1M bytes per second, for example, the operation takes about 0.6 second. For a specific pattern having nine pixels, the operation takes about 1.8 seconds, and this is a significant reduction in the processing time as compared with the conventional pattern extractor.

Although in the above embodiment, where the specific pattern consists of three pixels, the shift vector data S includes two vectors of $\vec{OR}_1$ and $\vec{OR}_2$, in general cases where the shift vector data S has vectors of n in number, the first transforming means implements the raster operation between $A_1$ and $B_0$ to obtain $B_1$, between $A_2$ and $B_1$ to obtain $B_2$, between $A_3$ and $B_2$ to obtain $B_3$, and so on until implementing the raster operation between $A_n$ and $B_{n-1}$ to obtain $B_e$; thereby transforming the initial binary image data A into the extraction pattern existence binary image data $B_e$, and the second transforming means implements the raster operation between $B_{e1}$ and $C_0$ to obtain $C_1$, between $B_{e2}$ and $C_1$ to obtain $C_2$, between $B_{e3}$ and $C_2$ to obtain $C_3$, and so on until implementing the raster operation between $B_{en}$ and $C_{n-1}$ to obtain $C_n$, thereby transforming the extraction pattern existence binary image data $B_e$ into the extraction pattern restoration binary image data $C_e$.

Figure 32:
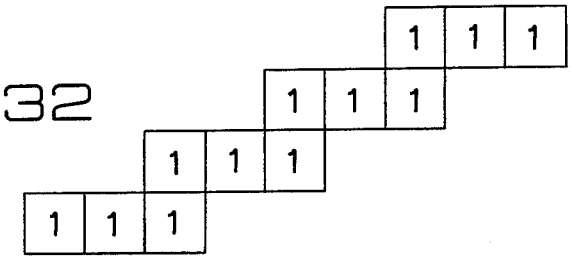
FIG. 32 is a diagram used to explain a specific pattern encountered by the sixth embodiment of this invention.

Although in the foregoing fifth embodiment of this invention lines along the x-axis have been extracted, lines with inclination can be extracted in the similar manner. By using the specific pattern 65 shown in FIG. 26, lines with an inclination close to zero as shown in the sixth embodiment of FIG. 32 can be extracted. To get more suppressed inclination of a line to be extracted, in the case of a line along the x-axis, the specific pattern is elongated along the x-axis. The number of 1's pixels of a specific pattern is determined appropriately based on the initial binary image data from which lines are intended to extract.

Figure 33:
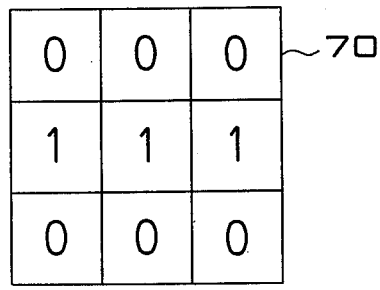
FIG. 33 is a diagram used to explain a specific pattern encountered by the seventh embodiment of this invention.
Figure 34:
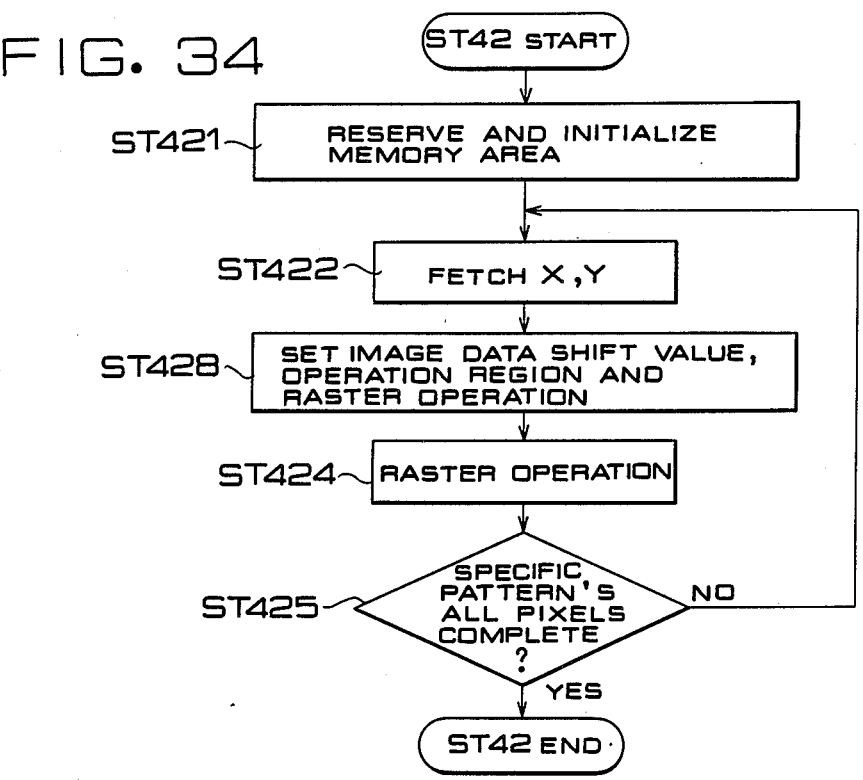
FIGS. 34 and 35 are flowcharts showing in detail the process steps of the seventh embodiment shown in FIG. 33.
Figure 35:
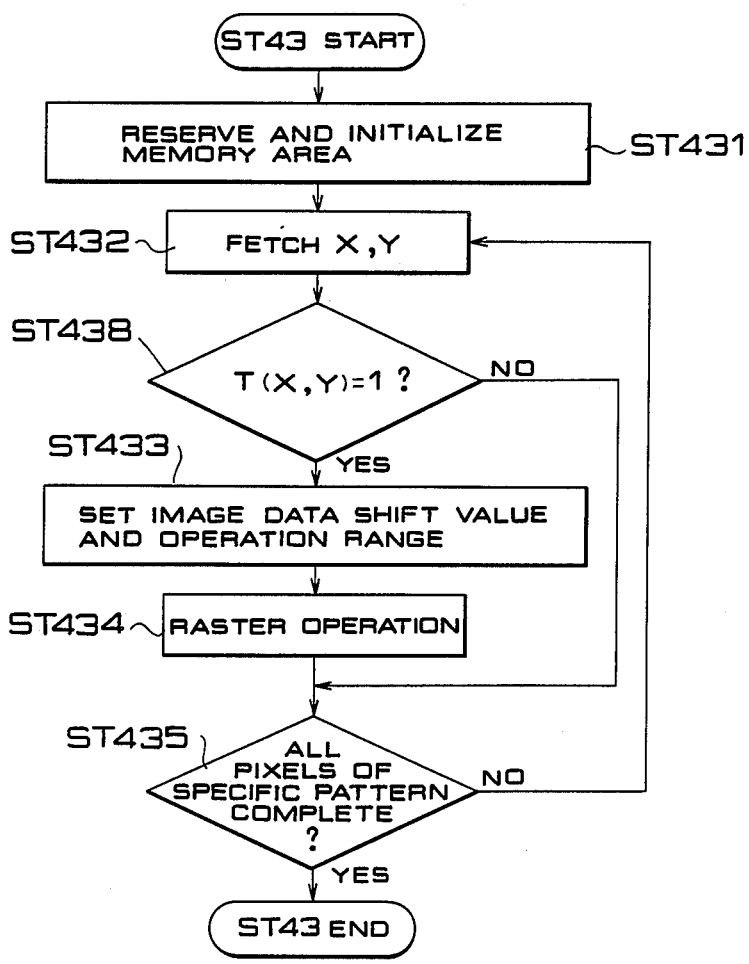

Although the foregoing fifth and sixth embodiments are capable of extracting any line which is wider than the width of the specific pattern, they are lacking in the sureness of extracting only narrow lines. For extracting especially only narrow lines, the use of a specific pattern 70 as shown by the seventh embodiment in FIG. 33 enables the extraction of only lines having a specific width (1-pixel width in FIG. 33). In this case, the raster operation for the 0's pixels in FIG. 33 is different from that for 1's pixels in the fifth embodiment. Namely, the step ST42 by the first transforming means 61 in the seventh embodiment implements the following expression (27) instead of expression (25) in the fifth embodiment.

$$D_1(x, y) \leftarrow \overline{I(x+X, y+Y)} \cdot D_1(x, y) \qquad (27)$$

where (x, y) stands for the coordinates of 0's pixels with respect to the reference pixel O, and $\overline{I(x+X, y+y)}$ is the negation of $I(x+X, y+Y)$. The second transforming means 62 does not execute the raster operation in case a pixel of the specific pattern 70 is "0". Accordingly, the steps ST42 and ST43 are developed as shown in FIGS. 34 and 35, respectively. In FIG. 35, step ST428 sets the shift value and operational region, and step ST424 sets the type of raster operation implemented in step ST424. For a specific pattern 70 of T(x, y), expression (25) is specified if T(x, y)=1, or expression (27) is specified if T(x, y)=0. In FIG. 35, the step ST438 tests the value of the specific pattern 70, i.e., T(x, y), and if it is found "1" step ST434 executes the raster operation of expression (26), or if it is found "0" the steps ST433 and ST434 are skipped and the step ST435 is executed.

Although the foregoing the fifth, sixth and seventh embodiments have explained the extraction of lines, the present invention is also applicable for the extraction dashed lines, dotted lines, dot-and-dash lines, double-dot-and-dash lines, and the like as shown by the eighth embodiment in FIGS. 36 through 38C.

Figure 36:
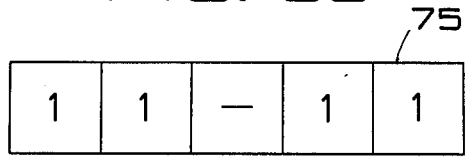

FIG. 36 shows a specific pattern 75 for extracting a dashed line. The pixel marked by symbol "—" can take either "0" or "1", and for such a pixel the raster operations (expressions (25) and (27)) the step ST424 by the first transforming means 61 and the step ST434 by the second transforming means 62 do not take place.

Figure 37A:
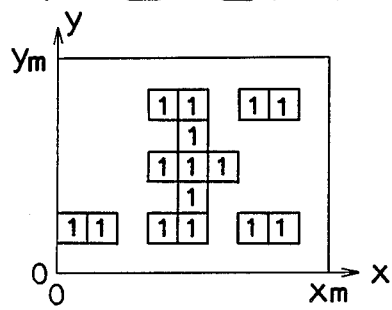
Figure 37B:
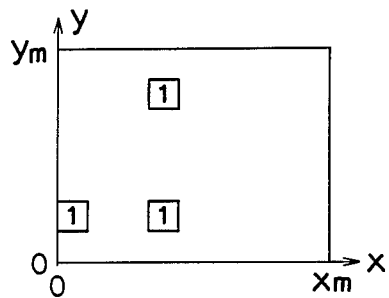
Figure 37C:
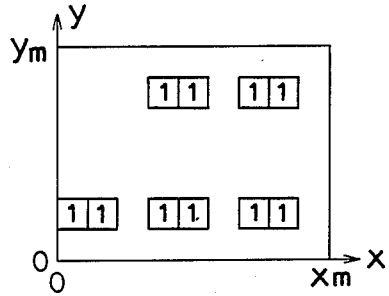
Figure 37D:
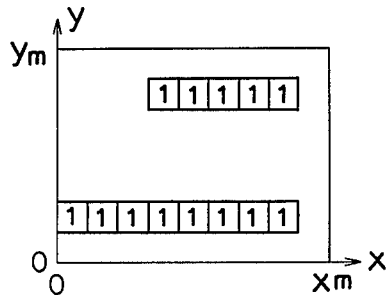

FIGS. 37A-37D show the operation of dashed-line extraction using the specific pattern 75 shown in FIG. 36. Shown in FIG. 37A is the initial binary image data A, i.e., I(x, y), FIG. 37B is the pattern existence binary image data $B_e$, i.e., $D_1(x, y)$, obtained in the step ST42, and FIG. 37C is the pattern restoration binary image data $C_e$, i.e., $D_2(x, y)$, obtained in the step ST43. The raster operation (expression (27)) in the step ST434 may be executed for pixels marked by "—", and in this case dashed lines are extracted as if they are continuous lines, and the pattern restoration binary image data $C_e$ is as shown in FIG. 37D.

Figure 38A:
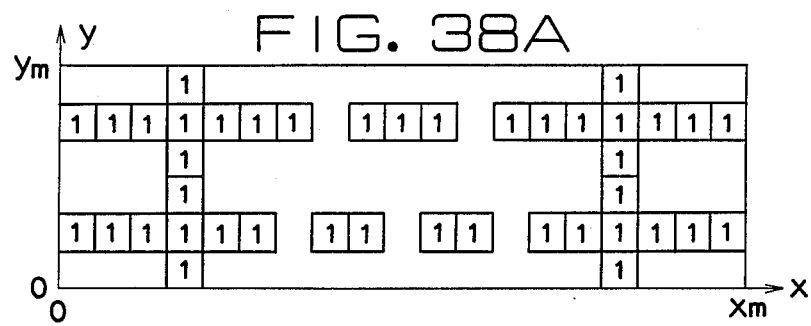
Figure 38B:
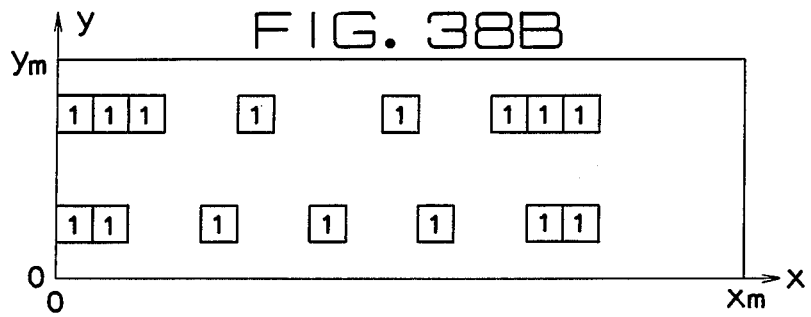
Figure 38C:
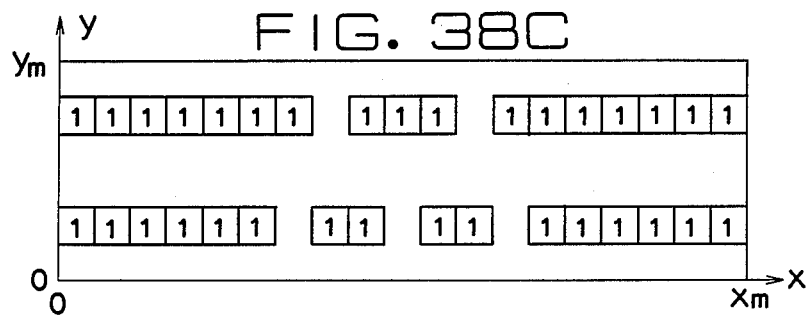

FIGS. 38A-38C show the operation of extracting dash-and-dot lines and dash-and-double-dot lines using the specific pattern 75 shown in FIG. 36. Shown by FIG. 38A is the initial binary image data A, i.e., I(x, y), FIG. 38B is the pattern existence binary image data $B_e$, i.e., $D_1(x, y)$, obtained in the step ST42, and FIG. 38C is the pattern restoration binary image data $C_e$, i.e., $D_2(x, y)$, obtained in the step ST43, the figure showing an extracted dash-and-dot line and dash-and-double-dot line.

Although in the eighth embodiment $D_1(x, y)$ has been initialized to "1", the initialization is rendered unnecessary if the step ST424 at the first time executes the following expression (28) instead of expression (25), and when T(x, y) is "0" the following expression (29) is executed instead of expression (27).

$$D_1(x, y) \leftarrow I(x + X, y + Y) \tag{28}$$

$$D_1(x, y) \leftarrow \overline{I(x + X, y + Y)} \tag{29}$$

Similarly, initialization of $D_2(x, y)$ to "0" is rendered unnecessary if the step ST434 at the first time executes the following expression (30) instead of expression (26).

$$D_2(x, y) \leftarrow D_1(x+X, y+Y) \tag{30}$$

Initialization for $D_1(x, y)$ and $D_2(x, y)$ in the steps ST421 and ST431 may be implemented in the step ST41 instead.

Although in the above description lines formed of 1's pixels have been extracted, it is also possible to extract lines of 0's pixels through the reverse treatment for logic values "1" and "0". Reversing "1" and "0" in $D_1(x, y)$ and $D_2(x, y)$ to extract a line of 1's pixels, it can be expressed as a line of 0's pixels on $D_1(x, y)$ or $D_2(x, y)$.

I(x, y), $D_1(x, y)$ and $D_2(x, y)$ may be stored in separate memories provided that they can undergo the raster operation by the raster arithmetic unit 63. Particularly, by storing $D_2(x, y)$ in the memory within the display unit, the operation result can be displayed promptly on the screen.

The present invention is also applicable to the color image data including several kinds of the binary image data.

If, in the step ST424 by the first transforming means 61, the whole $D_1(x, y)$ results in "0", implying that the specific pattern is absent in the initial binary image data A, i.e., I(x, y), the step ST42 may be aborted and further steps ST433, ST434 and ST435 may be skipped.

Figure 39A:
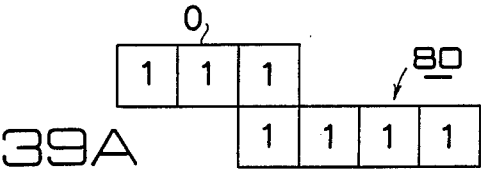
FIGS. 39A and 39B are diagrams showing a specific pattern and partial pattern encountered by the ninth embodiment of this invention.
Figure 39B:
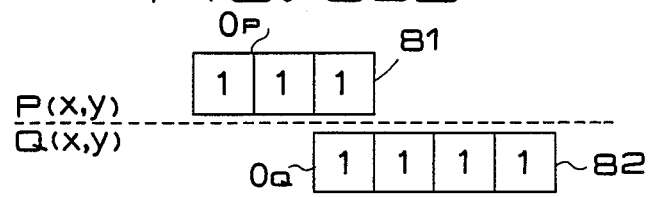

As shown by the ninth embodiment, a specific pattern may be divided into a plurality of partial patterns in implementing the extraction. The ninth embodiment will be described using FIGS. 39A and 39B and FIGS. 40A through 40E. Shown in FIG. 39A is a specific pattern 80 to T(x, y) to be extracted, and FIG. 39B are partial patterns 81 to P(x, y) and 82 to Q(x, y) divided from the specific pattern 80. These patterns 80, 81 and 82 have reference pixels O, $O_P$, and $O_Q$, respectively.

Figure 40A:
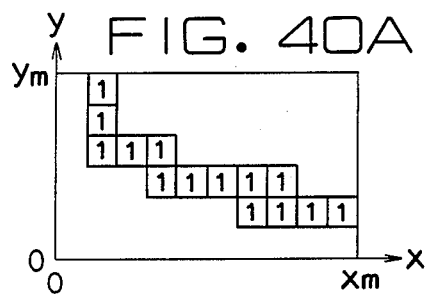
FIGS. 40A-40E are diagrams used to explain the operation of the ninth embodiment of this invention.
Figure 40B:
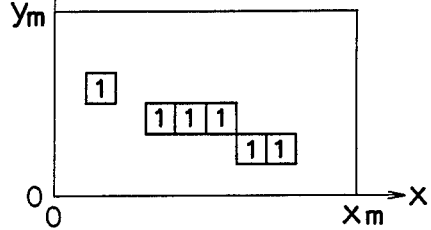
Figure 40C:
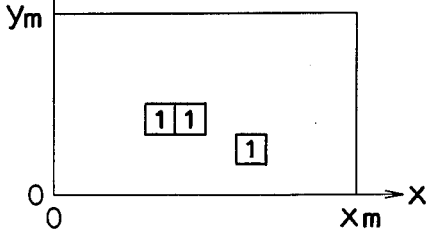

The step ST42 produces the pattern existence binary image data $B_{eP}$, i.e., $D_{1P}(x, y)$, and $B_{eQ}$, i.e., $D_{1Q}(x, y)$, from the partial patterns 81 to P(x, y) and 82 to Q(x, y) as specific patterns. FIG. 40A shows the initial binary image data A, i.e., I(x, y), FIG. 40B shows the pattern existence binary image data $B_{eP}$, i.e., $D_{1P}(x, y)$, and FIG. 40C shows the pattern existence binary image data $B_{eQ}$, i.e., $D_{1Q}(x, y)$.

The following raster operations take place.

$$D_1(x, y) \leftarrow D_{1P}(x + X_P, y + Y_P) \tag{31}$$

$$D_1(x, y) \leftarrow D_{1Q}(x + X_Q, y + Y_Q) \cdot D_1(x, y) \tag{32}$$

Figure 40D:
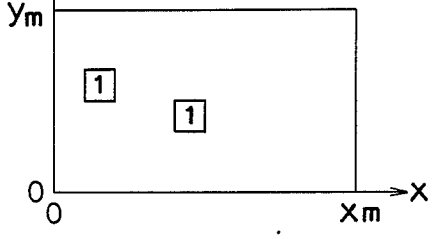

FIG. 40D shows the pattern existence binary image data $B_e$, i.e., $D_1(x, y)$, which is the result of expression (32).

The step ST43 takes place in the similar way. The pattern existence binary image data $B_e$, i.e., $D_1(x, y)$ is transformed into the pattern restoration binary image data $C_{eP}$, i.e., $D_{2P}(x, y)$ and pattern restoration binary image data $C_{2Q}$, i.e., $D_{2Q}(x, y)$ restored from the partial patterns P(x, y) and Q(x, y), and the following raster operations are carried out.

$$D_2(x, y) \leftarrow D_{2P}(x - X_P, y - Y_P) \tag{33}$$

$$D_2(x, y) \leftarrow D_{2Q}(x - X_Q, y - Y_Q) + D_2(x, y) \tag{34}$$

Figure 40E:
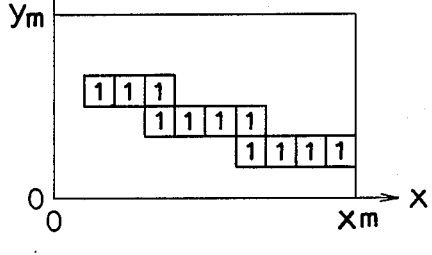

FIG. 40E shows the pattern restoration binary image data $C_e$, i.e., $D_2(x, y)$ which is the result of expression (34). The specific pattern shown in FIG. 39A is extracted as shown. In this embodiment, when the P(x, y) and Q(x, y) are the same pattern, the pattern existence binary image data $B_e$, i.e., $D_{1P}(x, y)$, becomes equal to $D_{1Q}(x, y)$, and the pattern existence binary image data $C_e$, i.e., $D_{2Q}(x, y)$ becomes equal to $D_{2Q}(x, y)$, and therefore the operation is necessary only for one of partial patterns P(x, y) and Q(x, y), whereby the number of operations can be reduced. The CPU 60 implements control for the binary image data, operational region and shift value in the raster operation.

Although the step ST42 for detecting the pattern reference pixel is designed to detect only portions which completely match the specific pattern, the raster operation may be set so that portions which partly match the specific pattern are detected.

Figure 41:
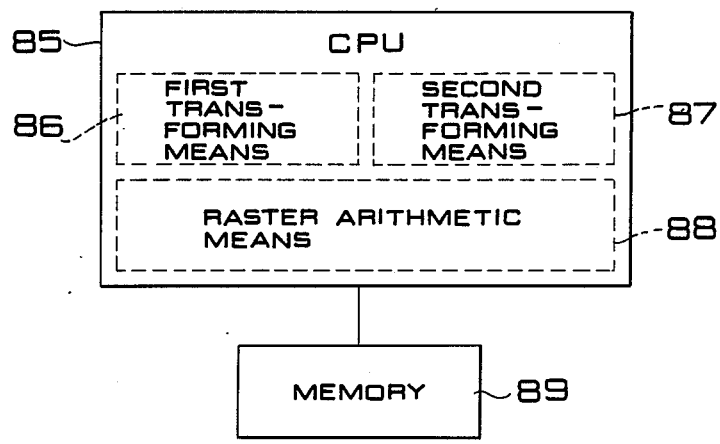
FIG. 41 is a block diagram showing the arrangement of the tenth embodiment of the inventive pattern recognition system.

Although in the above description of the pattern recognition system the raster arithmetic unit 63 and CPU 60 are provided separately, the present invention is not confined to this scheme, but the system may be configured by a CPU 85 including a first and second transforming means 86 and 87 and a raster operation unit 88, and a memory 89, as shown by the tenth embodiment in FIG. 41. The tenth embodiment operates in the same steps as the second embodiment shown in FIG. 13, and explanation is not repeated here.

Figures 42, 43A, 43B:
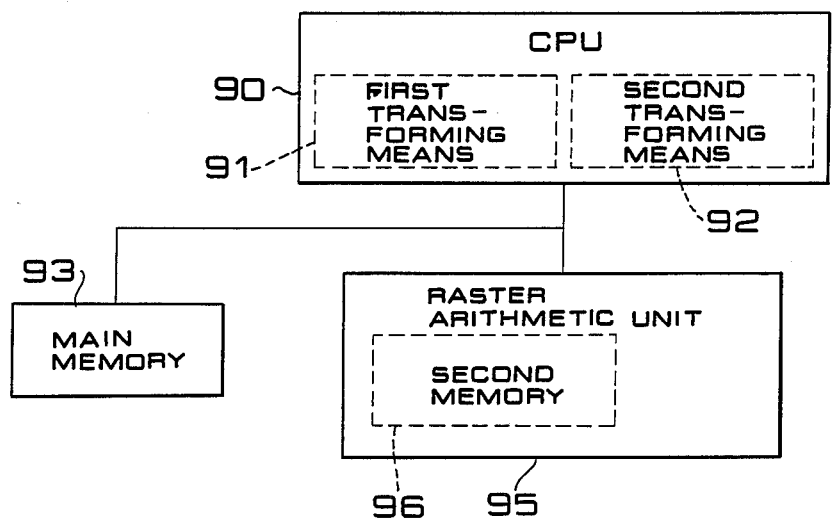

Although in the foregoing fifth through tenth embodiments the memory is provided separately from the section implementing arithmetic operations and processing functions, the present invention is not confined to this scheme, but the memory may be incorporated in the raster operation unit as shown by the eleventh embodiment shown in FIG. 42, as well as the third embodiment shown in FIG. 14. The pattern recognition system of the eleventh embodiment shown in FIG. 42 includes a CPU 90 having a first and second transforming means 91 and 92, a main memory 93, and a raster arithmetic unit 95 having a second memory 96.

The operation of the eleventh embodiment will be described in the following. The initial binary image data A, i.e., (x, y), is stored in the second memory 96 within the raster arithmetic unit 95, and shift vector data S pertinent to a specific pattern T(X, Y) is stored in the main memory 93. According to the shift vector data S stored in the main memory 93, the CPU 90 controls the type of operation memory area used by the raster operation unit 95. The first and second transforming means 91 and 92 perform the raster operations for the initial binary image data A, i.e., I(x, y), stored in the second memory 96 within the raster operation unit 95 and the binary image data for raster operation $D_1(x, y)$ and $D_2(x, y)$ stored in the second memory 96, and the result is stored in the second memory 96 in the raster operation unit 95.

Although the foregoing fifth through eleventh embodiments have been described for the extraction of linear figures such as solid lines and dashed lines, the present invention achieves the same effect as for the above embodiments for the extraction of edges and general patterns.

FIGS. 43A and 43B show the twelfth embodiment pertinent to specific patterns 100 and 110 for extracting figures other than the linear ones. Shown in FIG. 43A is specific pattern 100 for extracting edges, and FIG. 43B is a specific pattern 110 for extracting cross patterns.

As described above in detail, the inventive pattern recognition system presents the following effectiveness.

Two pieces of the binary image data (e.g., the initial binary image data and the intermediate binary image data resulting from the operation for the initial data in a certain sequence of operations) are treated to undergo a raster operation between each other by a raster operation means by taking out corresponding bit regions from both data under control of a processing or transforming means which bases the control on the logical operation designation data (e.g., the shift vector data which moves a specific pattern in a certain direction and distance to make matching with a pattern to be identified) stored in a memory which stores the initial binary image data as well as various operation result data, whereby the specific pattern can be identified in the initial binary image data in a short time even using an existing hardware devices.

The inventive pattern recognition system is capable of fast operational processing by utilizing existing hardware devices, eliminating the need of a separate expensive, fast operation processing unit or its control unit, whereby the system performance can be enhanced while retaining or reducing the system manufacturing cost.

What is claimed is:

1. A pattern recognition system comprising:
   (a) a memory unit including means for storing therein initial binary image data (A) in which a specific pattern is identified, shift vector data (S) for prescribing shift vectors ($s_i$; i=1, 2, . . . ) indicating direction and distance of shift for said initial binary image data (A) to coincide with a specific pattern for identification, binary pixel data ($P_i$; i=1, 2, . . . ) which belong to said shift vector data (S), each having value "1" or "0" determined by the specific pattern, and pattern location binary image data ($B_e$) which indicates the position of the specific pattern in said initial binary image data (A) when the specific pattern exists in the initial binary image data (A);
   (b) a raster arithmetic unit for implementing a raster bit for bit arithmetic operation which reduces values of shift vector between two binary image data, take out corresponding bit regions, and stores a logical operation result of the bit regions in said memory unit; and
   (c) a transforming means which executes a raster operation including a logical operation in accordance with the binary data ($P_i$; i=1, 2, . . . ) which belong to the shift vectors ($S_i$; i=1, 2, . . . ) between {a plurality of a first binary image data ($A_i$; i=1, 2, . . . ) for raster operation} located at a shifted position for the binary image data (A) in accordance with a plurality of shift vectors ($S_i$; i=1, 2, . . . ) prescribed by the shift vector data (S) and a second binary image data for raster operation consisting of the initial binary image data (A) and intermediate-recognition binary image data ($B_i$; i=1, 2, . . . ); and transforms the initial binary image data (A) into the pattern location binary image data ($B_e$) by repeating a process for obtaining the intermediate-recognition binary image data ($B_i$; i=1, 2, . . . ) which is to be a subsequent second binary image data for raster operation by a number of times prescribed by the shift vector data (S).

2. A pattern recognition system comprising:
   (a) a memory unit for storing a plurality of partial pattern location binary image data ($B_{ei}$; i=1, 2, . . . ), each indicating the existence of a partial pattern divided from a specific pattern in initial binary image data (A) in which the specific pattern is to be identified; logical operation designation data (L) for prescribing an operational sequence and a type of logical operation for the partial pattern location binary image data ($B_{ei}$) in order to identify the specific pattern; and final pattern location binary image data ($B_{ee}$) obtained as a final result of the logical operation;

(b) a raster arithmetic unit for implementing a raster arithmetic operation which takes out corresponding bit regions from two binary image data in accordance with the logical operation designation data (L), implements the logical operation for the bit regions, and stores the result in said memory unit; and (c) processing means which executes a raster operation based on the partial pattern location binary image data ($B_{ei}$) in accordance with an operational sequence and type of logical operation prescribed by the logical operation designation data (L); thereby obtaining the final pattern location binary image data ($B_{ee}$).

3. A pattern recognition system according to claim 2, wherein said logical operation designation data (L) sets said operational sequence and type of logical operation for the partial pattern location binary image data ($B_{ei}$) so as to obtain a location where at least partial patterns of m in number out of partial patterns of n in number divided from the specific pattern exist in the initial binary image data (A);

said raster arithmetic unit implementing the operation of the following expression or a variant thereof:

$$B_{aj} = B_{ej1} \cdot B_{ej2} \cdot B_{ej3} \cdot \ldots \cdot B_{ejm}$$
$$B_e = B_{a1} + B_{a2} + \ldots + B_{a_nC_m}$$

where symbol "·" signifies the logical-product operation, and "+" signifies the logical-sum operation; $_nC_m$ is a number of combinations of taking integers of m in number out of integers of n in number ranging from 1 to n; j is the j-th combination of taking m from n; $j_1, j_2, \ldots, j_m$ are elements of the j-th combination, $j_k = 1, 2, \ldots, n$, where $k = 1, 2, \ldots, m$.

4. A pattern recognition system according to claim 2, wherein said logical operation designation data (L) includes a shift vector not only for prescribing an operational sequence and a type of logical operation for the partial pattern location binary image data ($B_{ei}$) but also for prescribing a shift value of the partial pattern location binary image data ($B_{ei}$) in executing a logical operation by said raster operation unit.

5. A pattern recognition system according to claim 4, wherein said shift vector comprises a vector having a start point at the reference point of a partial pattern and an end point at the reference point of the specific pattern.

6. A pattern recognition system comprising:
(a) a memory unit including means for storing therein initial binary image data (A) in which a specific pattern is identified, shift vector data (S) for prescribing shift vectors ($s_i$; $i = 1, 2, \ldots$) indicating direction and distance of shift for the initial binary image data (A) to coincide with a specific pattern for identification; pattern location binary image data ($B_e$) which indicates the position of the specific pattern in the initial binary image data when the specific pattern exists in the initial binary image data; and pattern restoration binary image data ($C_e$) which is a result of identification by restoration of the specific pattern in the pattern location binary image data ($B_e$);

(b) a raster arithmetic unit for implementing a raster arithmetic operation which reduces values of shift vector between two binary image data, take out corresponding bit regions, and stores a logical operation result of the bit regions in said memory unit;

(c) a first transforming means which executes a raster operation including a logical operation between {a plurality of first binary image data ($A_i$; $i = 1, 2, \ldots$)} for raster operation located at a shifted position for the binary image data (A) in accordance with a plurality of shift vectors ($S_i$; $i = 1, 2, \ldots$) prescribed by the shift vector data (S) and {second binary image data for raster arithmetic operation consisting of the initial binary image data (A) and intermediate-recognition binary image data ($B_i$; $i = 0, 1, 2, \ldots$)} and transforms the initial binary image data (A) into the pattern location binary image data ($B_e$) by repeating a process for obtaining the intermediate-recognition binary image data ($B_i$; $i = 1, 2, \ldots$) which is to be a subsequent second binary image data for raster operation for a number of times prescribed by the shift vector data (S); and (d) a second transforming means which executes a raster arithmetic operation including a logical operation between {a plurality of third binary image data for raster operation (Bei; $e_i = e_1, e_2, \ldots$)} located at a position shifted a plurality of number of times for the pattern location binary image data ($B_e$) in the opposite direction and equal distance to the shift for the initial binary image data (A) by said first transforming means and {a fourth binary image data for raster arithmetic operation consisting of the pattern location binary image data ($B_e$) and intermediate-restoration image data ($C_i$; $i = 0, 1, 2, \ldots$)} and transforms the pattern location binary image data ($B_e$) into the pattern restoration binary image data ($C_e$) by repeating a process for obtaining the intermediate-restoration binary image data ($C_i$) which is to be the fourth binary image data for raster operation by a number of times prescribed by the shift vector data (S).

7. A pattern recognition system according to claim 6, wherein said shift vector data (S) is determined by positional information of the specific pattern and a value of pixels.

8. A pattern recognition system according to claim 6, wherein said logical arithmetic operation implemented by said first transforming means between the first binary image data ($A_i$) for raster operation and the second binary image data ($B_i$) for raster operation is a logical-product operation.

9. A pattern recognition system according to claim 6, wherein said first transforming means operates to transform said initial binary image data (A) into the pattern location binary image data ($B_e$) through sequential operations in such a way that the raster arithmetic operation is carried out between the initial binary image data (A) and the first binary image data ($A_1$) to obtain intermediate binary image data ($B_1$), the raster arithmetic operation is carried out between the first binary image data ($A_2$) and the intermediate binary image data ($B_1$) to obtain the next intermediate binary image data ($B_2$), and so on, and finally the raster arithmetic operation is carried out between the first binary image data ($A_e$) for raster operation and intermediate binary image data ($B_{e-1}$) to obtain said pattern location binary image data ($B_e$).

10. A pattern recognition system according to claim 6, wherein said logical arithmetic operation implemented by said second transforming means between the third binary image data ($B_{ei}$) for raster operation and the fourth binary image data for raster operation is a logical-sum operation.

11. A pattern recognition system according to claim 6, wherein said second transforming means operates to transform said pattern location binary image data ($B_e$) into the pattern restoration binary image data ($C_e$) through sequential operation in such a way that the raster arithmetic operation is carried out between the pattern location binary image data ($B_e$) and the third binary image data ($B_{e1}$) for raster operation to obtain the intermediate-restoration binary image data ($C_1$), the raster arithmetic operation is carried out between said intermediate-restoration binary image data ($C_1$) and the third binary image data ($B_{e2}$) for raster operation to obtain the next intermediate-restoration binary image data ($C_2$), the raster arithmetic operation is carried out between said intermediate-restoration binary image data ($C_2$) and the next third binary image data ($B_{e3}$) for raster operation to obtain the next intermediate-restoration binary image data ($C_3$), and so on, and finally the raster arithmetic operation is carried out between the intermediate restoration binary image data ($C_{e-1}$) and the third binary image data ($B_{ee}$) for raster operation to obtain said pattern restoration binary image data ($C_e$).

* * * * *

UNITED STATES PATENT AND TRADEMARK OFFICE
CERTIFICATE OF CORRECTION

PATENT NO. : 4,852,183
DATED : July 25, 1989
INVENTOR(S) : SHIGERU ABE ET AL.

It is certified that error appears in the above-identified patent and that said Letters Patent is hereby corrected as shown below:

```
Front Page, Col. 2, [57], line 26, "for" should be --from--
Col. 1, line 13, "tion" should be --tions--.
Col. 2, line 67, delete the paragraph indentation.
Col. 5, line 6, "date" should be --data--.
Col. 6, line 10, after "18" insert --,--.
Col. 8, line 47, "0≦y≦m-Y" should be --0≦y≦ym-Y--;
Col. 8, line 67, "examples" should be --example--.
Col. 10, line 38, delete "and".
Col. 11, line 50, "bv" should be --by--;

Col. 13, line 23, after "data" insert --,--.
Col. 14, line 67, "come" should be --comes--.
Col. 16, line 19, "y+Y₁" should be --y+y₁--; same line,
                  after "be" insert --used--.
Col. 17, line 55, "u" should be --up--.
Col. 19, line 4, "tee" should be --the--.
Col. 20, line 2, "imaqe" should be --image--.
Col. 21, line 2, "35" (second occurrence) should be --34--.
Col. 24, line 13, delete "an".

Col. 25, line 61, "(sᵢ⁻" should be --(Sᵢ⁻--.
Col. 26, line 5, after "reduces" insert --the--;
```

UNITED STATES PATENT AND TRADEMARK OFFICE
CERTIFICATE OF CORRECTION

PATENT NO. : 4,852,183
DATED : July 25, 1989
INVENTOR(S) : Shigeru Abe et al

It is certified that error appears in the above-identified patent and that said Letters Patent is hereby corrected as shown below:

Col. 26, line 6, "take" should be --takes--.

Signed and Sealed this

Twenty-fifth Day of September, 1990

Attest:

HARRY F. MANBECK, JR.

*Attesting Officer*        *Commissioner of Patents and Trademarks*